US012619941B2

(12) United States Patent
Piccolo et al.

(10) Patent No.: US 12,619,941 B2
(45) Date of Patent: May 5, 2026

(54) TECHNICAL CANDIDATE CERTIFICATION SYSTEM

(71) Applicant: FullStack Labs, Inc., San Antonio, TX (US)

(72) Inventors: Michael Frank Piccolo, Austin, TX (US); David Matthew Jackson, Austin, TX (US)

(73) Assignee: FullStack Labs, Inc, San Antonio, TX (US)

( * ) Notice: Subject to any disclaimer, the term of this patent is extended or adjusted under 35 U.S.C. 154(b) by 36 days.

(21) Appl. No.: 18/665,441

(22) Filed: May 15, 2024

(65) Prior Publication Data

US 2024/0386362 A1      Nov. 21, 2024

Related U.S. Application Data

(60) Provisional application No. 63/634,262, filed on Apr. 15, 2024, provisional application No. 63/466,958, filed on May 16, 2023.

(51) Int. Cl.
*G06Q 10/0639*      (2023.01)
*G06F 11/3604*      (2025.01)

(52) U.S. Cl.
CPC ... *G06Q 10/06398* (2013.01); *G06F 11/3616* (2013.01); *G06F 2201/865* (2013.01)

(58) Field of Classification Search
CPC ........... G06Q 10/06398; G06F 11/3616; G06F 2201/865
USPC ........................................................ 705/7.42
See application file for complete search history.

(56) References Cited

U.S. PATENT DOCUMENTS

| | | | |
|---|---|---|---|
| 6,618,734 B1 | 9/2003 | Williams | |
| 6,984,177 B2 | 1/2006 | Lydon | |
| 7,496,518 B1 | 2/2009 | Cayton | |
| 8,655,793 B2 | 2/2014 | Asaimuthu | |
| 10,303,517 B1 | 5/2019 | Sloyan | |
| 10,353,703 B1 | 7/2019 | Sloyan | |
| 2009/0217246 A1 | 8/2009 | Kondur | |
| 2015/0142685 A1 | 5/2015 | Willis | |
| 2019/0361791 A1 | 11/2019 | Sloyan | |

(Continued)

OTHER PUBLICATIONS

"Machine Learning based Code Assessment Systems", Ainapure et al., Mar. 23, 2023 (Year: 2023).*

*Primary Examiner* — Po Han Lee
(74) *Attorney, Agent, or Firm* — Critical Path IP Law, LLC

(57)      ABSTRACT

Systems and methods to asynchronously vet, appraise, grade, rank and certify technical candidates for hiring are described. The technical candidate certification system administers and evaluates a set of specialized and customized evaluations of a technical candidate to generate a technical candidate ranking value, the ranking value typically provided relative to other technical candidates. The set of evaluations are customized to the job requirements of the client employer and to the profile of the candidate employee, and may be specialized to the hiring of software developer candidate employees. In one aspect, the technical candidate ranking system administers a software coding test and a technical interview, and provides an assessment and measure of a candidate's language proficiency. The client employer is provided with a ranking value of the recommended employee candidates.

20 Claims, 12 Drawing Sheets

(56) References Cited

U.S. PATENT DOCUMENTS

| 2021/0200662 | A1* | 7/2021 | Li | ........................... | G06N 20/00 |
| 2021/0224751 | A1* | 7/2021 | Nagalingam | ......... | G06F 40/131 |
| 2021/0334761 | A1 | 10/2021 | Thombre | | |
| 2023/0305942 | A1* | 9/2023 | Thome | ................ | G06F 11/3684 |

* cited by examiner

600

| Attribute | Group | Weight | Score | Weighted score |
|---|---|---|---|---|
| Coding Challenge | | | | |
| Speaking and code explanation | 12% | 12 | 4 | 48 |
| State Management / Data management | | 30 | 5 | 150 |
| UI Design Matching / CSS | 64% | 24 | 6 | 144 |
| Testing | | 10 | 7 | 70 |
| Typing / Tooling Skill | 4% | 2 | 8 | 16 |
| Task Organization and planning | | 2 | 9 | 18 |
| Time management | 20% | 8 | 8 | 64 |
| Acceptance Criteria | | 12 | 7 | 84 |
| | | | | |
| | | | | |
| | | | | |
| | | | | |
| Overall score | | 100 | 6.75 | 6.94 |

TECHNICAL CANDIDATE CERTIFICATION SYSTEM

CROSS-REFERENCE TO RELATED APPLICATIONS

This application is a nonprovisional patent application of and claims the benefit of U.S. Provisional Patent Application No. 63/466,958 titled "Technical Candidate Ranking System" filed May 16, 2023, and U.S. Provisional Patent Application No. 63/634,262 titled "Technical Candidate Interview and Coding Scoring System of a Technical Candidate Ranking System" filed Apr. 15, 2024, the disclosures of both are hereby incorporated herein by reference in entirety.

FIELD

The disclosure relates generally to systems and methods involving technical candidate certification for hiring, and specifically to systems and methods to asynchronously vet, grade, rank and certify technical candidates for hiring.

BACKGROUND

Conventional approaches to the hiring of technical candidates are at best slow and inaccurate and at worst frustrate if not anger the employee candidate and the hiring employer. The hiring of technical candidates, such as software developers, is particularly challenging given the specialized skills involved and the limited hiring pool of employee candidates. Many employee candidates are non-native language speakers of the hiring employer, presenting a further challenge to assess language proficiency. Given such challenges, many employers outsource technical candidate hiring recommendations to third party technical candidate outsourcing entities.

Employee candidates and hiring parties (referred to as "clients") generally prefer a streamlined hiring process that saves time and effort compared with conventional interviewing that frequently does not involve skill tests. Some candidates and/or clients prefer automated processes where there is limited to no direct verbal communication. However, if verbal communication is involved, a party may prefer a limited number of interviews and no skill tests. Broadly, junior candidates are more accepting of skill tests than senior candidates (who often have limited time available.)

Candidate identification and skill verification (aka vetting) companies may help speed up the hiring process and bring more candidates into the pipeline, but they typically do fewer tests than necessary, which significantly affects the analysis of the candidates. This precision in assessing the candidates' profiles is termed "accuracy." If the candidate identification and skill verification (aka "outsourcing") company doesn't provide accuracy and the client understands the importance of it, they will spend more time deciding on a candidate and more money analyzing and filtering out a good one from the others. Also, if an outsourcing company takes too long to make a decision about the candidates, the candidate may take on a new position with another company, and, in the meantime, the client may decide to cancel the deal for various reasons, such as having already found what they need with other outsourcing companies. The clients save time if the candidates' profiles contain all the details they need to know. However, it doesn't matter how much data there is if it is not accurate or searchable, which is why the attribute depends directly on accuracy and platform.

Lastly, some companies, such as very large software-intensive companies, may perform excessive testing (i.e., several hours with multiple participating teams) which can be inefficient and limit the candidate pool.

Conventional technical outsourcing entities vary widely in approaches to handling technical candidate hiring recommendations. Most approaches require sequential processing of a candidate applicant, meaning one part of the review process may not occur until another is complete, leading to unnecessary delays that frequently cause the applicant to disengage. Many processes produce inaccurate results in that applicants are recommended for hire who are not qualified for the position, creating disappointed employer clients. Furthermore, conventional processes and systems result in (candidate) assets that are not both distributable and visible (in contrast, the technical candidate ranking system of the disclosure provides assets that are both distributable and visible).

The technical candidate ranking system of the disclosure solves these challenges with traditional approaches, systems, and methods to identify certified job candidates. (The term "certified" means genuine or authentic). The technical candidate ranking system administers and evaluates a set of specialized and customized evaluations of a technical candidate to generate a technical candidate ranking value, the ranking value typically provided relative to other technical candidates. The set of evaluations are customized to the job requirements of the client employer and to the profile of the candidate employee, and specialized to the hiring of software developer candidate employees. In one aspect, the technical candidate ranking system administers and autonomously grades a software coding test and a technical interview, and provides an assessment and measure of a candidate's language proficiency. The client employer is provided with a ranking value of the employee candidate and those receiving a positive certification (that is, those recommended for hiring) are presented.

The process is asynchronous in that the candidate may plan and take the challenges on their own schedule. In one embodiment, the process may be synchronous, but the candidate may select or choose when each of the challenges are executed. Also, the technical candidate ranking system of the disclosure generates a hire recommendation and a rank while also allowing a third party to verify that assessment themselves, garnering trust in the system and in the rank.

Note that although the technical candidate ranking system and method of use as described will focus on the evaluation of technical software candidates, the system and method may be applied in other environments. For example, the system may be applied in other areas of employee vetting situations in which specialized skills are required and that benefit from specialized automated testing, to include, for example, candidates for accounting roles in which specialized testing (e.g., one or more accounting challenges) may be administered.

SUMMARY

The described invention, among other things, solves the problem of how to automatically evaluate and certify technical job candidates through a sequence of steps including administering and grading of a particularized candidate interview, administering, and grading a set of particularized software coding tests to the candidate, and ranking and evaluating the set of grades against a database of prior candidate grades using weighted measures, ultimately proving a positive or a negative certification of a technical job candidate.

In one embodiment, a system for certifying a technical employee candidate is described, the system comprising: a system database configured to: i) store a set of coding challenges, each comprising a set of notional coding files; ii) store a set of updated coding files and a set of new coding files; iii) store a set of system scoring parameters; iv) store a set of technical interviews comprising a set of technical interview questions; and v) store a candidate interview audio answer data; a user interface configured to: i) administer to a candidate a particular coding challenge; ii) receive from the candidate the set of new coding files and the set of updated coding files, the set of notional coding files changed by the candidate to create the set of updated coding files; iii) administer to the candidate a particular technical interview; and iv) receive the candidate interview audio answer data; a processor configured to: i) receive a set of employee candidate requirements; ii) define a set of particular candidate evaluations comprising the particular coding challenge and the particular technical interview; iii) retrieve the set of new coding files and the set of updated coding files from the system database; iv) retrieve the set of system operator scoring parameters from the system database; v) record the candidate interview audio answer data; and vi) record a candidate verbal comment data generated by the candidate when creating the set of updated coding files; wherein the processor operates to: execute the set of new coding files and the set of updated coding files; perform a set of coding tests on the set of new coding files and the set of updated coding files; digitally transcribe the candidate verbal comment data into digitally transcribed candidate verbal comment data; calculate a set of coding test scores based on the set of coding tests, the digitally transcribed candidate verbal comment data, and at least some of the set of system scoring parameters; calculate a candidate coding score based on the set of coding test scores; execute the technical interview to generate the candidate interview audio answer data; digitally transcribe the candidate interview audio answer data into transcribed candidate interview answer data associated with the set of technical interview questions; calculate a candidate technical interview score based on the set of transcribed candidate interview answer data; and generate a ranking score and a certification decision for the employee candidate based at least on the candidate coding score and the candidate technical interview score.

In one aspect, the candidate technical interview score is established with use of an AI model. In another aspect, the candidate technical interview score is established with use of an LLM model. In another aspect, the set of coding tests include assessment of at least one of code smells, code vulnerabilities, code reliability, and code linting. In another aspect, the set of coding tests include assessment of code smells, code vulnerabilities, code reliability, and code linting. In another aspect, the transcribed candidate interview answer data is transformed into a set of vector representations. In another aspect, the set of vector representations are used as input into an AI model to establish the candidate technical interview score. In another aspect, at least one of the set of coding test scores is generated by an automated grading of at least one of the set of new coding files. In another aspect, the automated grading of at least one of the set of new coding files is associated with at least one of test code execution speed, test code security, and test code linting. In another aspect, the set of coding tests include assessment of code smells, code vulnerabilities, code reliability, and code linting.

In another embodiment, a method for certifying a technical employee candidate is disclosed, the method comprising: providing a system database configured to: i) store a set of coding challenges, each comprising a set of notional coding files; ii) store a set of updated coding files and a set of new coding files; iii) store a set of system scoring parameters; iv) store a set of technical interviews comprising a set of technical interview questions; and v) store a candidate interview audio answer data; a user interface configured to: i) administer to a candidate a particular coding challenge; ii) receive from the candidate the set of new coding files and the set of updated coding files, the set of notional coding files changed by the candidate to create the set of updated coding files; iii) administer to the candidate a particular technical interview; and iv) receive the candidate interview audio answer data; a processor configured to: i) receive a set of employee candidate requirements; ii) define a set of particular candidate evaluations comprising the particular coding challenge and the particular technical interview; iii) retrieve the set of new coding files and the set of updated coding files from the system database; iv) retrieve the set of system operator scoring parameters from the system database; v) record the candidate interview audio answer data; and vi) record a candidate verbal comment data generated by the candidate when creating the set of updated coding files; wherein the processor operates to: execute the set of new coding files and the set of updated coding files; perform a set of coding tests on the set of new coding files and the set of updated coding files; digitally transcribe the candidate verbal comment data into digitally transcribed candidate verbal comment data; calculate a set of coding test scores based on the set of coding tests, the digitally transcribed candidate verbal comment data, and at least some of the set of system scoring parameters; calculate a candidate coding score based on the set of coding test scores; execute the technical interview to generate the candidate interview audio answer data; digitally transcribe the candidate interview audio answer data into transcribed candidate interview answer data associated with the set of technical interview questions; calculate a candidate technical interview score based on the set of transcribed candidate interview answer data; and generate a ranking score and a certification decision for the employee candidate based at least on the candidate coding score and the candidate technical interview score.

By way of providing additional background, context, and to further satisfy the written description requirements of 35 U.S.C. § 112, the following references are incorporated by reference in their entireties: U.S. Pat. No. 6,618,734 to Williams et al; U.S. Pat. No. 7,496,518 to Cayton et al; U.S. Pat. No. 8,655,793 to Asaimuthu; U.S. Pat. No. 6,984,177 to Lydon et al; U.S. Pat. No. 10,353,703 to Sloyan et al.; and U.S. Pat. No. 10,303,517 to Sloyan et al.; and U.S. Pat. Publ. Nos. 2009/0217246 to Kondur et al; 2015/0142685 to Willis et al; 2021/0334761 to Thombre; and 2019/0361791 to Sloyan et al.

The word "app" or "application" means a software program that runs as or is hosted by a computer, typically on a portable computer, and includes a software program that accesses web-based tools, APIs and/or data.

The phrase "cloud computing" or the word "cloud" refers to computing services performed by shared pools of computer resources, often over the Internet.

The phrase "user interface" or "UI", and the phrase "graphical user interface" or "GUI", means a computer-based display that allows interaction with a user with aid of images or graphics.

The phrase "data sources" means a collection of accessible data that is accessed at a known location, to include physical locations such as a physical database and a virtual location, such as on a computing or storage cloud.

Also, the term "database" is not limited to a physical database, and may, for example, define a broader data source and may be any type of database, such as relational, hierarchical, object-oriented, and/or the like.

The phrases "intelligent system," "artificial intelligence," "bot" or "Bot," and "AI" mean a machine, system or technique that mimics human intelligence.

The phrase "large language model" means a foundation model trained on vast amounts of data capable of understanding and generating natural language.

The phrase "machine learning" means a subset of AI that uses statistical techniques to enable machines to improve at tasks with experience.

The phrases "neural networks" and "neural nets" means an AI construction modeled after the way adaptable networks of neurons in the human brain are understood to work, rather than through rigid predetermined instructions.

The phrases "natural language processing" and "natural language processor" mean computer processing that occurs in speech-recognition technology in which software recognizes spoken sentences or phrases and recreates spoken language into text.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

Various embodiments or portions of methods of manufacture may also or alternatively be implemented partially in software and/or firmware, e.g., analysis of signs. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following brief description in conjunction with the accompanying drawings, wherein like reference numerals designate like elements. The elements of the drawings are not necessarily to scale relative to each other. Identical reference numerals have been used, where possible, to designate identical features that are common to the figures.

7

Figure 1:
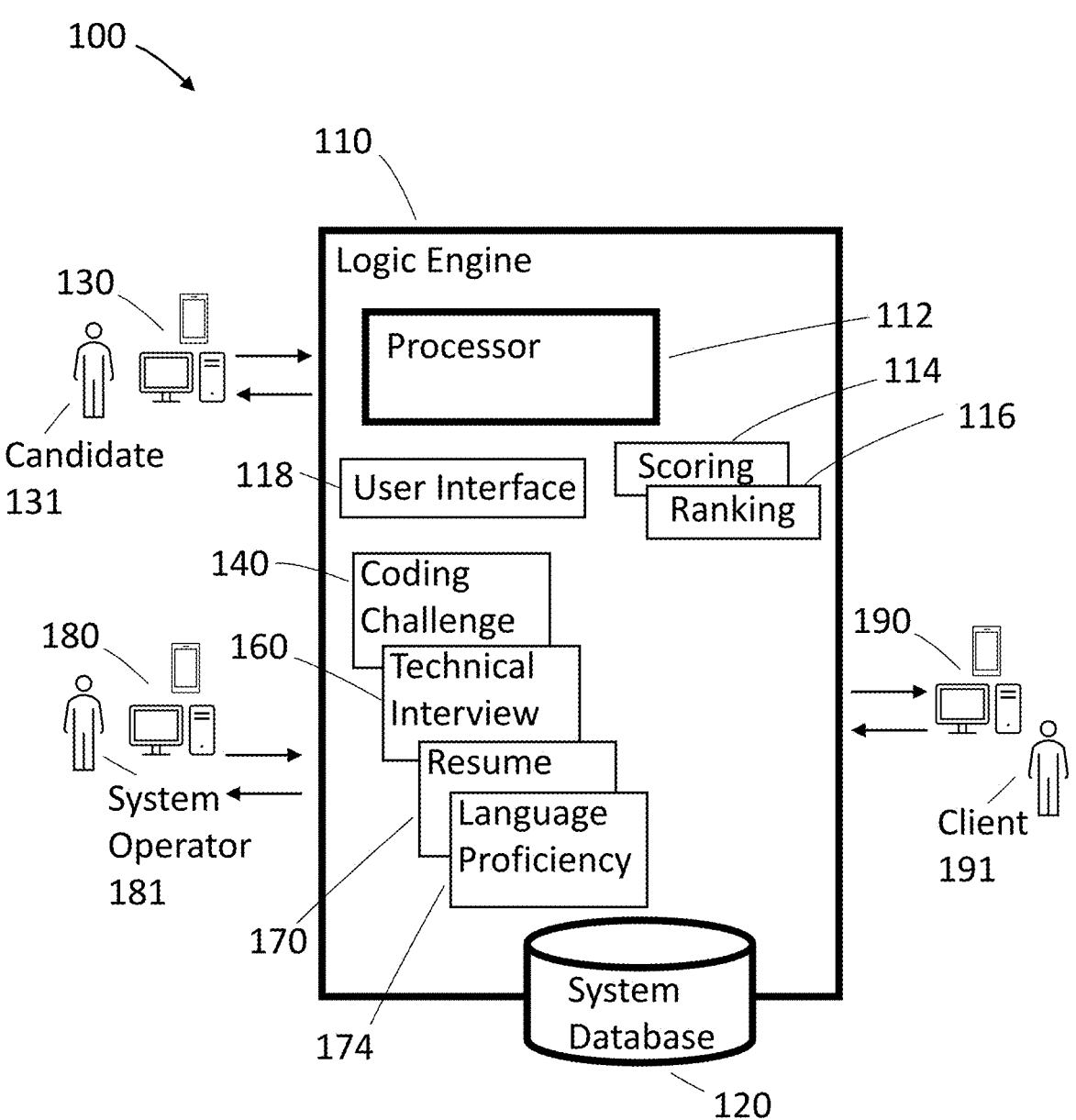
FIG. 1 is a depiction of one embodiment of a technical candidate certification system of the disclosure.
Figure 8A:
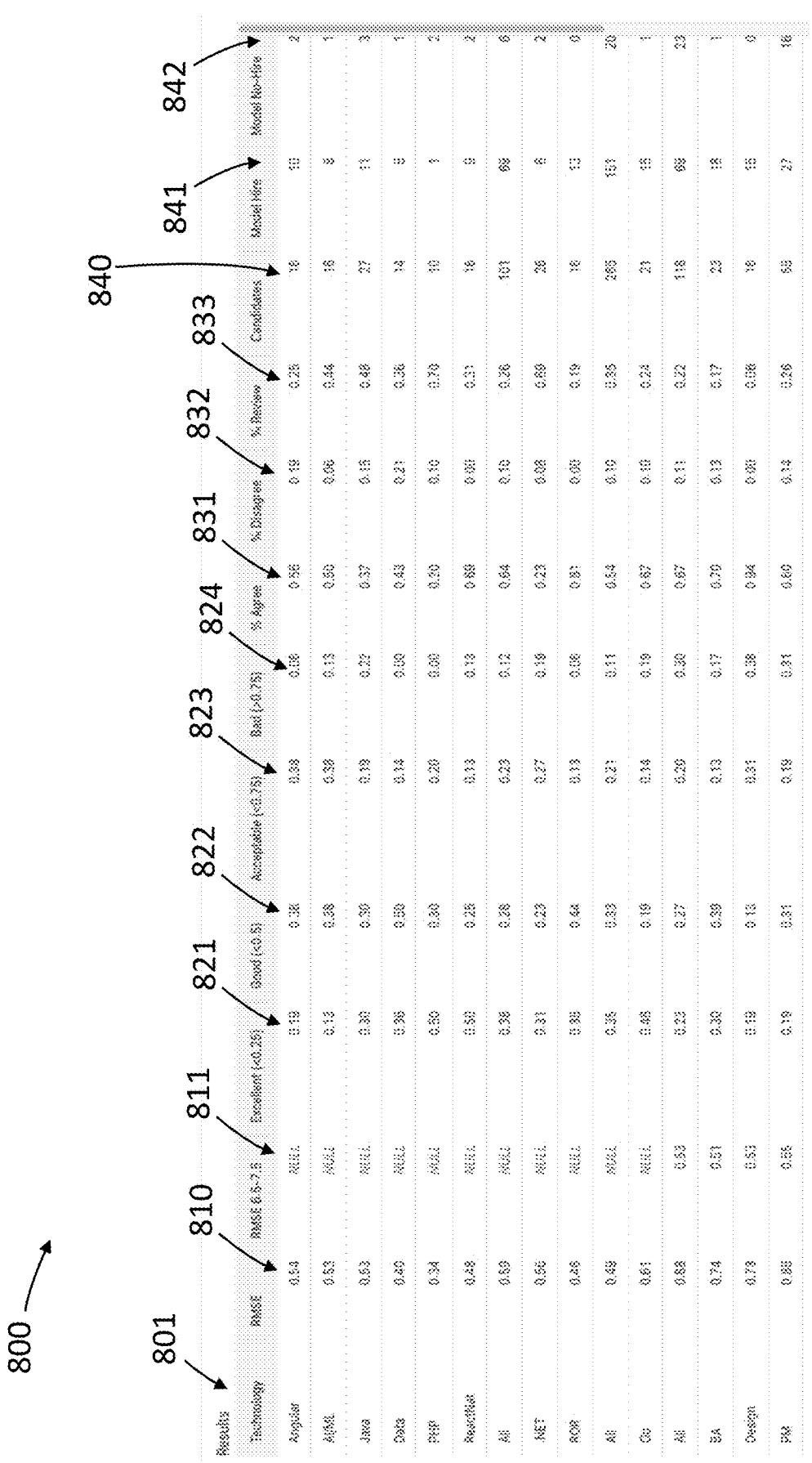
Figure 8B:
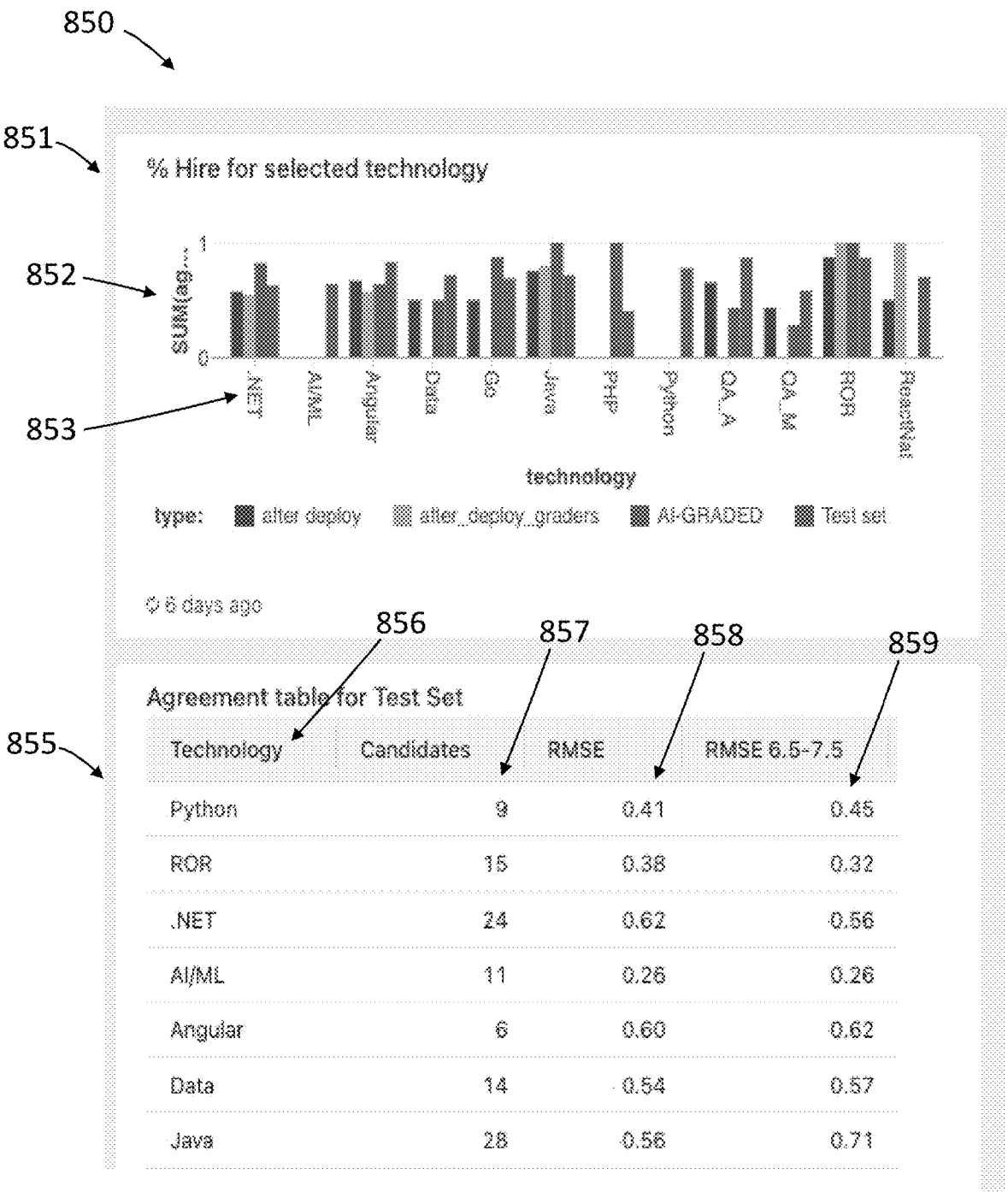
Figure 8C:
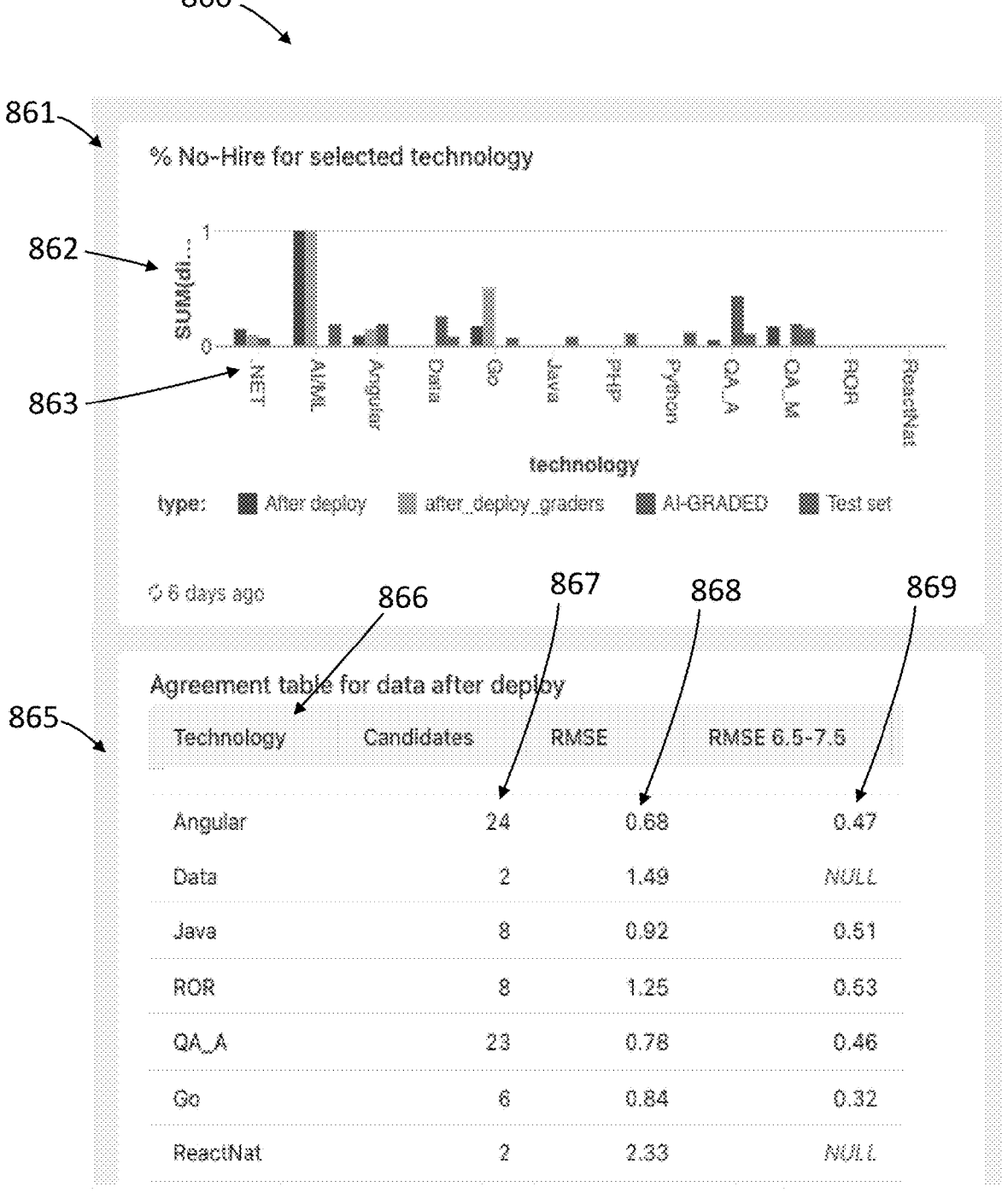
Figure 8D:
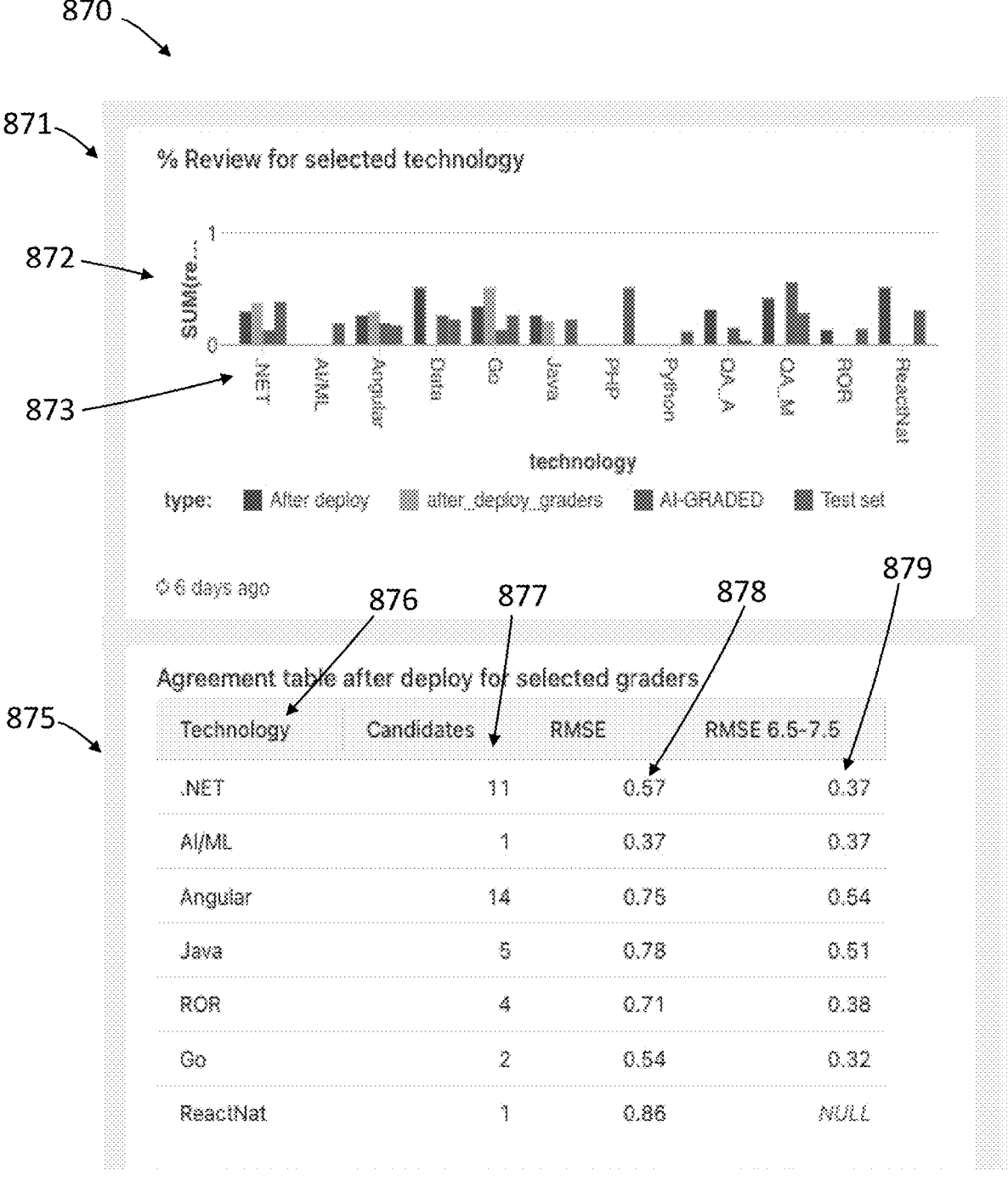

FIG. 8A is one embodiment of a development dashboard for the technical candidate certification system of FIG. 1;

FIG. 8B is one embodiment of a first portion of a monitoring dashboard for the technical candidate certification system of FIG. 1;

FIG. 8C is one embodiment of a second portion of a monitoring dashboard for the technical candidate certification system of FIG. 1; and FIG. 8D is one embodiment of a third portion of a monitoring dashboard for the technical candidate certification system of FIG. 1.

DETAILED DESCRIPTION

Reference will now be made in detail to representative embodiments. The following descriptions are not intended to limit the embodiments to one preferred embodiment. To the contrary, the descriptions are intended to cover alternatives, modifications, and equivalents as can be included within the spirit and scope of the described embodiments as defined, for example, by the appended claims.

Generally, the technical candidate certification system administers and evaluates a set of specialized and customized evaluations of a technical candidate to generate a technical candidate ranking value, the ranking value typically provided relative to other technical candidates, and/or to determine if a job candidate is recommended or certified for hiring. The set of evaluations are customized to the job requirements of the client employer and to the profile of the candidate employee, and, in most embodiments, specialized to the hiring of software developer candidate employees. In one aspect, the technical candidate certification system administers a software coding test aka a coding challenge and a technical interview, and/or provides an assessment and measure of a candidate's language proficiency. The client employer is provided with a ranking value of recommended aka certified employee candidates.

The disclosed devices, systems, and methods of use will be described with reference to FIGS. 1-8D. Generally, systems and methods to asynchronously appraise, grade, rank and certify technical candidates for hiring are described.

With attention to FIG. 1, one embodiment of a technical candidate certification system 100 is depicted. The "technical candidate certification system" may be referred to as "candidate certification system" or "certification system" or simply "system." With attention to FIG. 2, one embodiment of a methods of use 200 of the technical candidate certification system 100 of FIG. 1 is depicted. The method of use of the technical candidate certification system may be referred to as "certification system method" or "system method" or simple "method." Stated another way, the phrases "certification system" or simply by the term "system," or the phrases "certification system method," "system method" or simply by the term "method," may refer to any of the embodiments of the disclosure which involve any collection of the features described in the disclosure and is not limiting.

With attention to FIG. 1, the technical candidate certification system 100 comprises a system database 120, logic engine 110 comprising a processor 112, and user interface 118. One or more parties may engage or interact with the logic engine 110, to include an employee candidate 131, a system operator 181, and an employer client 191.

The employee candidate 130 is a party seeking consideration or certification for employment, such as with the (employer) client 191. The employee candidate 131 may engage or interact with the logic engine 112 by way of one or more devices 130, such as a laptop computer, desktop computer, tablet computer, smart device such as a smart phone, and any similar devices known to those skilled in the art. (The phrase "smart device" means a wired or wireless context-aware electronic device capable of performing autonomous computing and connecting to other devices for data exchange). Such one or more devices may interact or engage with the logic engine 110 through any of several means known to those skilled in the art, to include through direct (wired) connection and by wireless communication or by a wireless network. (The terms "wireless" or "WiFi" or the phrases "wireless communication" or "wireless network" mean communication conducted without a physical connector such as without a physical wire connection, and may include high frequency radio signals and any other mode of wireless transmission, such as infrared; examples include Bluetooth, Bluetooth low energy, ZigBee, cellular networks to include 4G and 5G, WiMAX, NFC, or any other wireless communication technologies, wireless networking types or protocols as known to those skilled in the art).

The system operator 181 may be any party authorized to manage aspects of the system 100, such as setting of weighting values and/or threshold values (described below) used in evaluating a particular candidate 131. The system operator may be any of a recruiter and a vetting engineer. The system operator 131 may provide a final review of one or more outputs, results, measures, recommendations, and/or or certifications generated by the technical candidate certification system 100. The system operator 181 may engage or interact with the logic engine 112 by way of one or more devices 180, such as a laptop computer, desktop computer, tablet computer, smart device such as a smart phone, and any similar devices known to those skilled in the art, and may interact or engage with the logic engine 110 through any of several means known to those skilled in the art, to include through direct (wired) connection and by wireless communication or by a wireless network.

The employer client 191 is the party interested in hiring a technical candidate, such as potentially hiring the employee candidate 131. The employer client 191 may engage or interact with the logic engine 112 by way of one or more devices 190, such as a laptop computer, desktop computer, tablet computer, smart device such as a smart phone, and any similar devices known to those skilled in the art, and may interact or engage with the logic engine 110 through any of several means known to those skilled in the art, to include through direct (wired) connection and by wireless communication.

In one embodiment, one or more of the communications between the users (e.g., 131, 181, 191) of the system 100 comprise or are enabled by a system app that performs one or more of the functions described above with respect to a user device. For example, the system app may allow the candidate user 131, by way of the system app, to input and/or receive data from logic engine 110. As another example, the candidate user 131 may use a system app to interact with the logic engine (in addition to or alternatively from the user interface 118). (The term "app" or "application" means a software program that runs as or is hosted by a computer, typically on a portable computer to include a portable computer such as user devices or smart phones and includes a software program that accesses web-based tools, APIs and/or data).

The logic engine 110 enables, by way of the processor 112 and through a set of machine-executable instructions, a set of functions or capabilities, to include operating a user interface 118, a system database 120, and various sub-processes or activities or system elements. The sub-processes enabled or driven or operated by or controlled by the logic engine 110 comprise a coding challenge 140 element, a technical interview 160 element, a resume 170 element, and a language 174 element. A scoring 114 element and a ranking element 116 are also enabled or driven or operated by or controlled by the logic engine 110. The scoring 114 and ranking 116 elements are associated with one or more of the coding challenge 140, a technical interview 160, resume 170, and language 174 elements. Among other things, the processor 112 is configured to operate on the system database 120 to: i) digitally transcribe the technical candidate interview audio data into a set of transcribed technical candidate interview answers mapped to the set of technical interview questions; and ii) assess, from the system database, a particular set of historical vectored pairing data associated with the set of technical interview questions. The processor 112 is further configured to retrieve a set of updated coding files from the system database, to retrieve a set of system operator scoring parameters from the system database, execute the set of updated coding files, perform the set of tests on the set of updated coding files, calculate a set of test scores based on the set of tests and the set of system operator scoring parameters, and calculate a technical candidate software coding score based on the set of test scores.

The user interface 118 may operate or render or drive one on more specialized user interfaces for the set of parties (e.g., the employee candidate 131, a system operator 181, and the employer client 191) that may engage the system 100. The user interface 118 may be provided directly to the aforementioned parties or may engage with one or more respective devices (130, 180, 190) of these parties. The user interface 118 is configured to receive technical candidate interview data comprising technical candidate interview audio data from a technical candidate interview, the technical candidate interview audio data in response to a set of technical interview questions. The user interface 118 is further configured to provide a set of notional coding files to a candidate user 131 and to receive a set of updated coding files from the candidate user 131, the set of notional coding files changed by the candidate to create the set of updated coding files.

Various types of data (spanning, e.g., recorded video data, numerical data, candidate software code, technical candidate interview data, such as audio data, and historical technical interview data, etc.) of the system 100 may be completely or partially stored in the system database 120. In one embodiment, the system database 120 stores data associated with other, previously evaluated candidates; such data may include e.g. technical interview data, coding challenges, and human evaluations. The system database 120 comprises a non-transitory computer-readable storage medium as is configured to store data of the system 100. It is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The system database 120 is configured to operate: i) to store technical candidate interview audio data; ii) to store a set of historical technical interview data comprising historical vectored pairing data, the historical vectored pairing data comprising a vector representation of a set of historical technical interview answers associated with the set of technical interview questions; and iii) to associate the technical candidate interview audio data with the set of historical technical interview data. The system database may include data from interviews with prior candidates and data from human (e.g., a company or automated interviewer) evaluations, as shown as element 232 in FIG. 2. The system database 120 may store the notional coding files, the updated coding files, and a set of system operator scoring parameters (described below).

In one embodiment, the databases and/or associated data of the system 100 or associated with the technical candidate certification system 100 and/or all or some elements of the system 100 operate in the cloud. (The phrase "cloud computing" or the word "cloud" refers to computing services performed by shared pools of computer resources, often over the Internet). In one embodiment, some or all of the computing or services or operations of the logic engine 110 are performed in the cloud.

In one embodiment, one or more of the user interfaces and/or user interface devices (e.g., 130, 180, 190) and/or the logic engine 110 operate in a respective client-server arrangement. (The phrase "client-server" or "client-server architecture" means a shared computer architecture in which the server hosts, delivers and manages the majority of the resources (e.g., computing resources) and services to be consumed by a client. There may be multiple clients connected to a single server over a network or internet connection.

In some embodiments, aspects or components of the technical candidate certification system 100 engage with or leverage AI or other automation technologies. No embodiment of the technical candidate certification system 100 is AI used to independently or ultimately determine a certification of an applicant. All embodiments of the technical candidate certification system 100 adhere to applicable legal requirements concerning employee hiring, including guidance documents issued by the U.S. Department of Labor's Office of Federal Contract Compliance Programs (OFCPP) and the U.S. Equal Employment Opportunity Commission (EEOC). The certification assessment design and implementation approach also follows industry best practices as well as professional guidelines.

Figure 2:
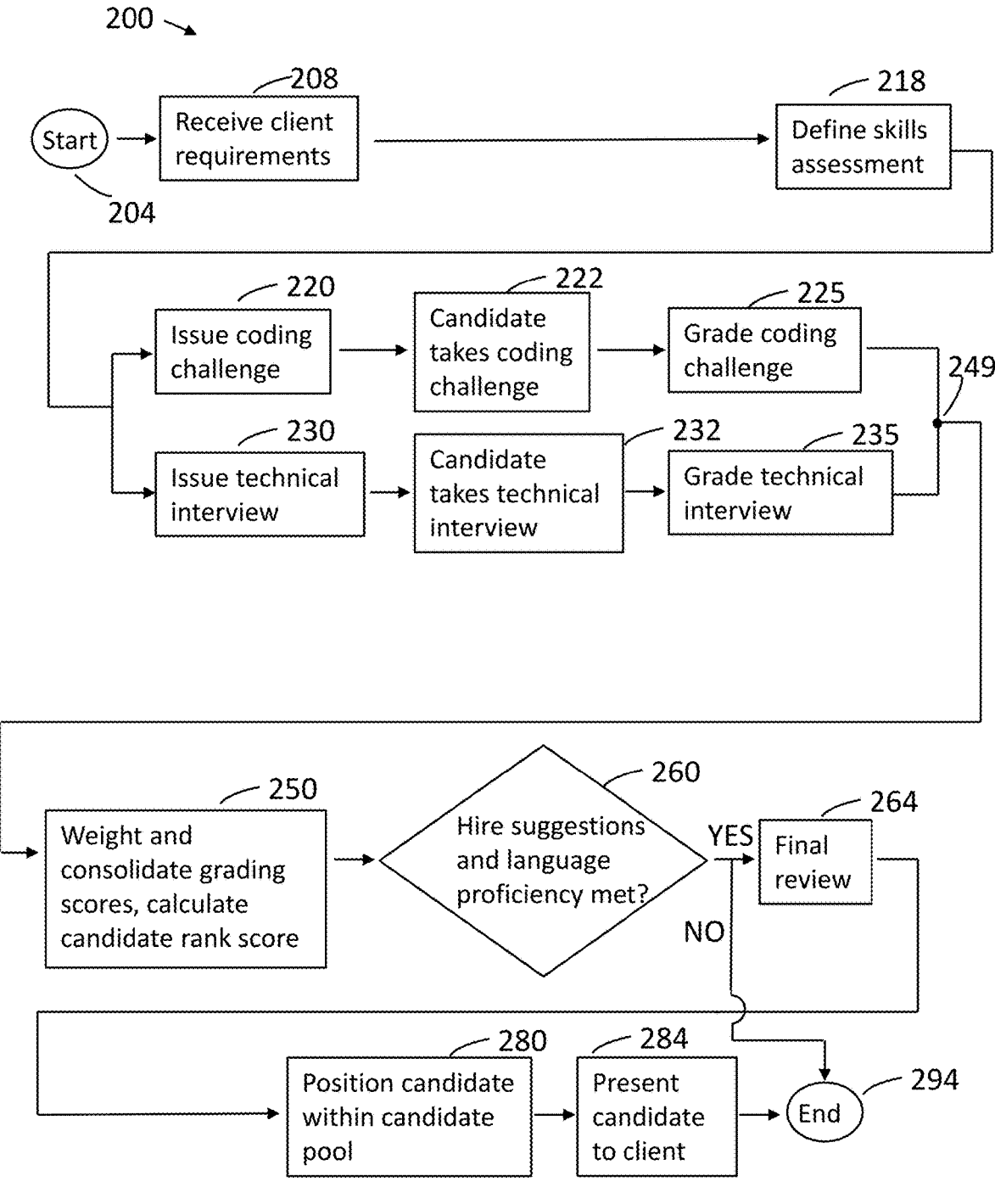
FIG. 2 is a schematic flow chart of one embodiment of a method of use of the technical candidate certification system of FIG. 1.

FIG. 2 is a schematic flow chart of one embodiment of a method of use 200 of the technical candidate certification system of FIG. 1. Note that in some embodiments, some functions or steps may be absent, occur in a different order, or include other functions or steps not shown. The method 200 will reference aspects of the technical candidate certification system 100 of FIG. 1, as well as detailed aspects of components or elements of the system as described in FIGS. 3 to 7. More specifically, FIGS. 3 and 4 describe aspects of the technical interview component of the technical candidate certification system, FIGS. 5 and 6 describe aspects of the coding challenge component of the technical candidate certification system, and FIG. 7 describes scoring aspects associated with the overall consolidated technical staff ranking value generated by the technical candidate certification system.

Generally, after establishing parameters for the evaluation of a technical candidate (aka an employee candidate), the system asynchronously administers a coding challenge and a technical interview, reviews an application (e.g., a candidate resume), and assesses language proficiency, then weighs evaluations of these elements to determine a consolidated technical candidate ranking value and certification for hire if appropriate. (The term "asynchronously" generally means the absence of a timing requirement, such as a process that may occur independently in time from another process). Note that the certification provided may, in one embodiment, be binary, i.e. a candidate is either deemed certified (to hire) or not certified.

The consolidated technical candidate ranking value, if accompanied by a positive hiring recommendation or certification, is then presented, in isolation or relative to other consolidated technical candidate ranking values of other candidates, to the employer client.

The technical candidate certification system method 200 of FIG. 2 begins at step 204 and ends at step 294. After starting at step 204, the method 200 proceeds to step 208 where the system receives client requirements for the employee candidate. Such requirements may include, e.g., years of experience, experience with a particular coding language, proficiency in a particular language, etc. All or some of the client requirement data may be stored in system database 120, in cloud-based storage, or by means known to those skilled in the art. (Generally, all or some of data associated with any of the elements of FIG. 2 except start 204 and stop 294 may be stored in system database 120, cloud-based storage, or by means known to those skilled in the art.) Stated another way, at step 208 the client requirements are collected, e.g.: technical skills required, level (years of experience), etc.

After completing step 208, the method proceeds to step 218 where a skills assessment is defined, meaning the parameters of the evaluation or testing of the skills of the candidate are defined. For example, the parameters of the coding challenge (e.g., type of coding problem, time to complete the coding problem, etc.) are established at step 218. Such parameters may be generated by way of data stored or accessed in system database 120. For example, previous collections or sets of coding challenges for the same or similar skills assessments (from other, previous candidates for like or similar roles) may be accessed or culled. Such data may be automatically collected or retrieved from the system database, or may be gathered manually. In some embodiments, the seniority level of the candidate is set and may in turn set parameters associated with the evaluations to occur in the method, such as the coding challenge and the technical interview. For example, the seniority level setting may frame or determine the degree of difficulty or complexity of the coding challenge issued to the candidate. In one embodiment, the coding challenges are the same no matter the seniority.

At the completion of step 218, the method 200 proceeds to steps 220 and 230, such steps occurring asynchronously. Stated another way, the components of the coding challenge (220, 222, 225) and technical interview (230, 232, 235) are not required to be performed in a particular sequence, meaning the technical interview components need not be started or completed before the coding challenge components are started or completed and vice versa. For clarity, the set of coding challenge elements (which are completed as a sequence of step 220 to step 222 to step 225) will be described, then the set of technical interview elements (230, 232, 235) will be described. Note that some aspects of the evaluations may be conducted by a human (referred to typically as a "technical vetting engineer" or a "vetting engineer") and some aspects may be performed in an automated or semi-automated manner.

Figure 4:
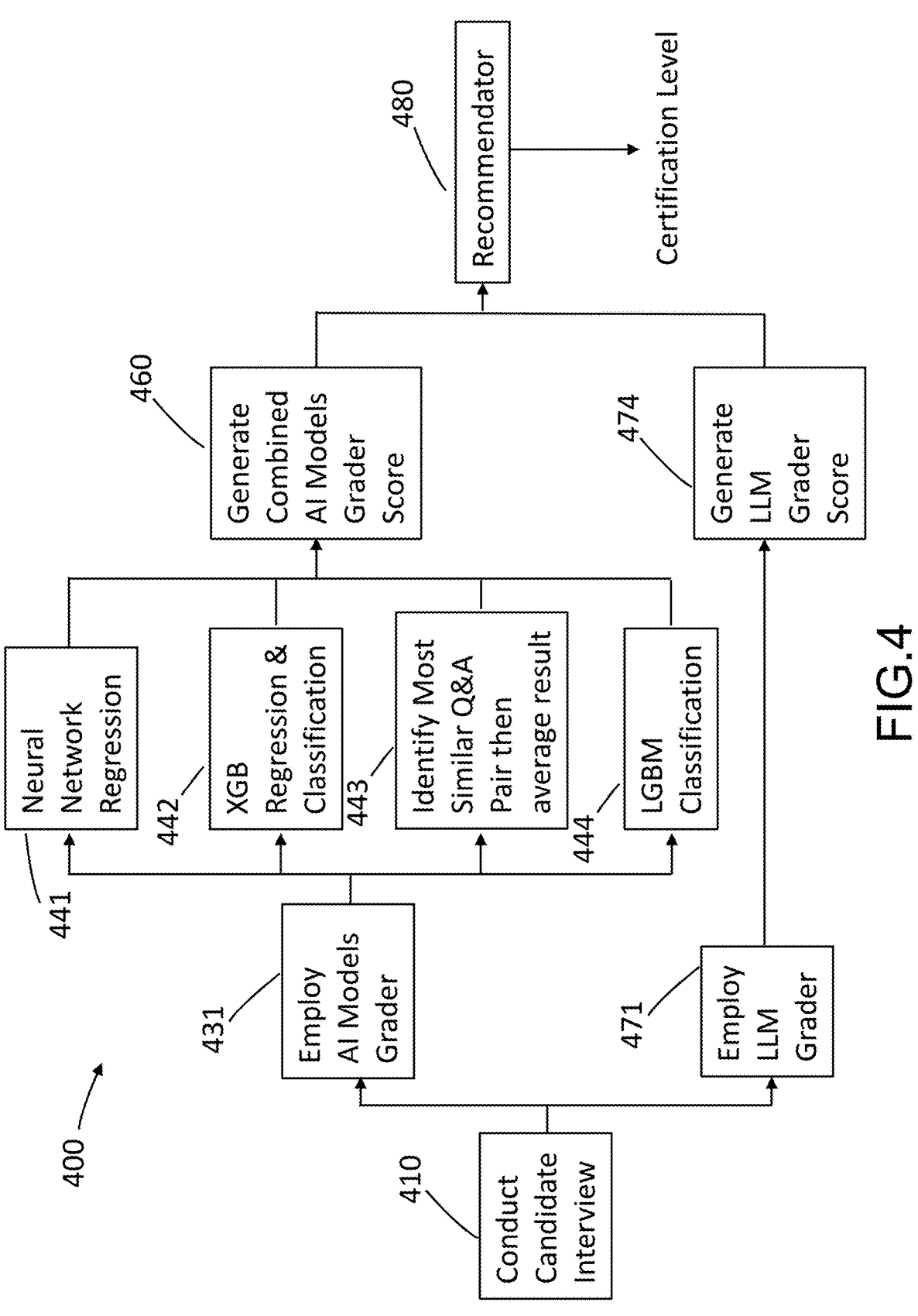
FIG. 4 is a schematic flow chart of another embodiment of the technical interview component of the technical candidate certification system of FIG. 1.
Figure 5:
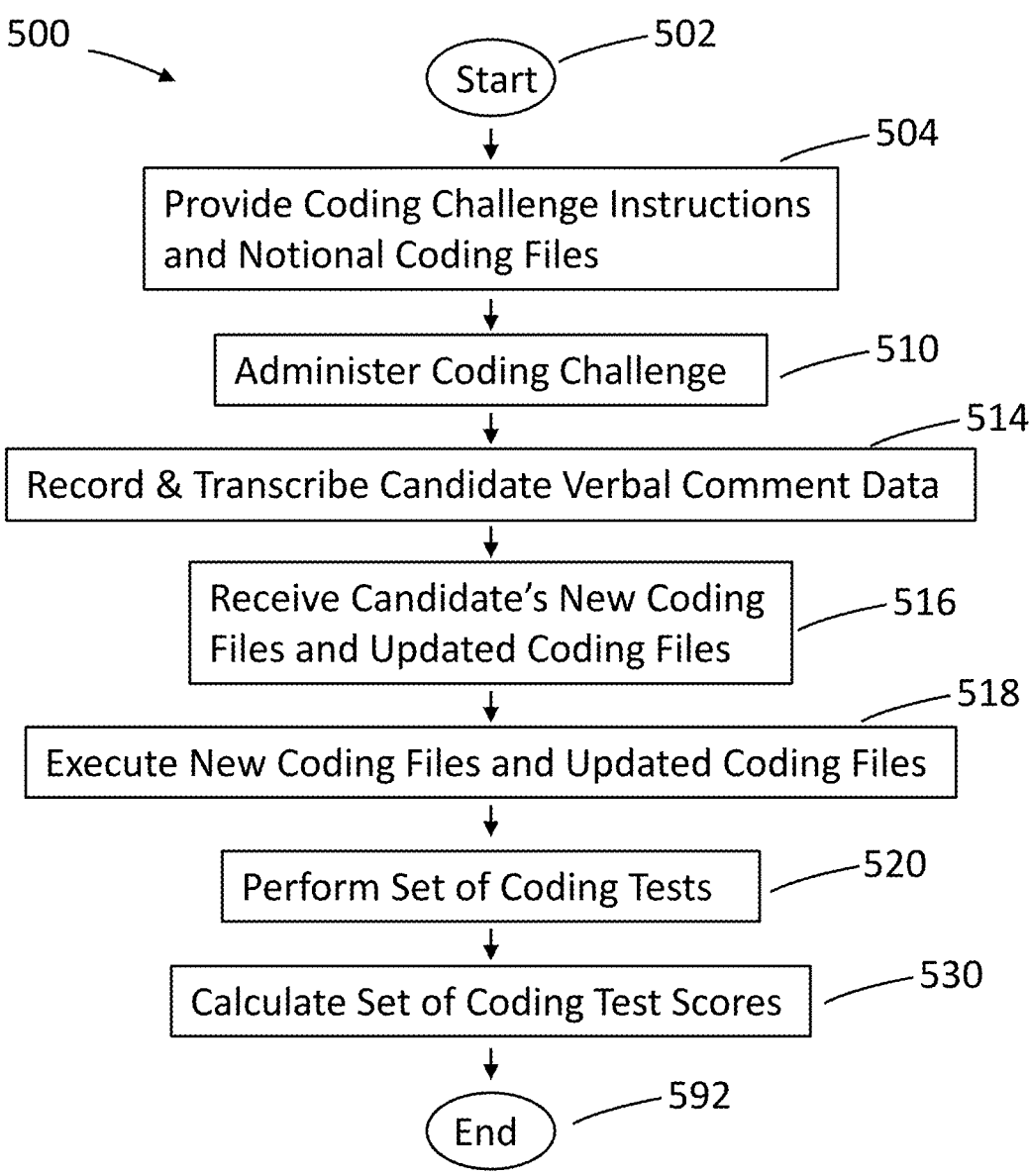
FIG. 5 is a schematic flow chart of one embodiment of a method of use of the coding challenge component of the technical candidate certification system of FIG. 1.
Figure 6:
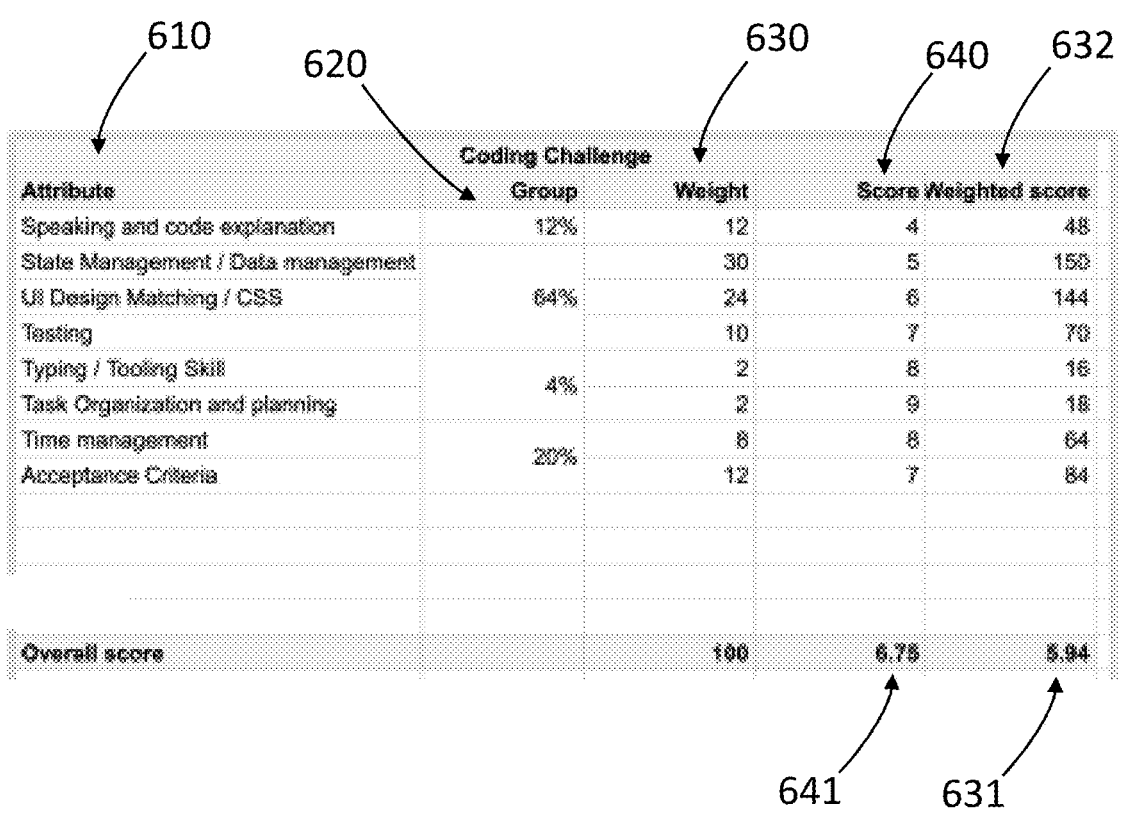
FIG. 6 is a depiction of certain scoring aspects associated with the coding challenge component of the technical candidate certification system of FIG. 1.

Additional descriptions of the coding challenge components are provided with respect to FIGS. 5 and 6. Additional description of the technical interview components are provided in FIGS. 3A-B and 4.

At step 220, the coding challenge is issued to the technical candidate. In one embodiment, the recruiter aka system operator 181 sends a communication to the candidate 131 which informs the candidate that the coding challenge is available and ready for the candidate to execute.

The candidate may receive a link to a webpage that instructs them on what is required for a successful coding challenge. The coding challenge is typically very focused on the technology the candidate works with daily. For example, a coding challenge may focus on React or Angular, sub-technologies under the JavaScript umbrella, rather than a broader challenge regarding JavaScript.

The candidate may be required to record their solving of the coding challenge from inception of the challenge, to include the candidate speaking through their aloud while coding. Such a recording assists in measuring or appraising a candidate's manner of thinking, level of English, and communication skills.

The coding challenge that is administered by the technical candidate certification system is different from a conventional quiz or a problem-solving challenge used in conventional systems or methods. For example, the coding challenge administered by the technical candidate certification system requires that the candidate must understand the code that is provided before the candidate begins coding and the candidate must code within a larger project. In a conventional problem-solving challenge, a candidate need not understand a larger view of how their generated code fits within a project or need to read any previous code. In many conventional coding quizzes administered in conventional systems or methods, the candidate need not actually code anything, but instead only demonstrate theoretical knowledge by selecting correct answers to objective questions or guessing which answer may be correct. If a candidate does not know the technology involved or haven't coded using that technology, it would be almost impossible for the candidate to be successful in the coding challenge of the disclosed technical candidate certification system. Even if a candidate is capable of coding to solve a particular coding challenge of the technical candidate certification system, the system's technical vetting engineers may determine if the candidate is using good or bad practices, for example, which would reveal the candidate's true seniority level. At the end of the instructions of the coding challenge, the candidate must solve a problem-solving challenge included in the same code base that is provided. Such an approach allows assessment of a candidate's ability to solve problems using algorithms to solve problems, and therefore distinguish those candidate's that may be proficient with technology but are not proficient at solving problems precisely.

The code challenge tests administered by the technical candidate certification system serve to evaluate a candidate's problem-solving ability and therefore provides a distinctive advantage over conventional systems and methods. Note that when one references problem-solving, one is referring to reasoning and algorithms, and not necessarily programming libraries.

In one embodiment of a candidate user interface 118 for the coding challenge component of the technical candidate certification system, the user interface comprises a general instruction screen and two detailed screens. The general instruction screen may comprise recommended duration times for required portions of the coding challenge, instructions for the coding tasks to be performed, and definitions of endpoints and input/outputs expected for the code portion the candidate is to develop. The candidate is asked to verbalize their thinking or logic while performing the coding challenge, such audio recorded by the system.

After completing step 220, the method proceeds to step 222 where the candidate takes or executes the coding challenge. At step 222, the candidate takes the coding challenge, which involves, among other things, creating software code for at least one presented problem that fits within a larger coding structure. In contrast, as described briefly above, conventional technical candidate evaluation systems typically present coding problems that are isolated problems or isolated algorithmic development problems, and/or present multiple choice theoretical problems. Also, as mentioned above, the candidate is required to verbally describe their thinking or logic while performing the coding challenge. Such a verbal description provides further insight into the coding skills (and language proficiency) of the candidate. After completing step 222, the method proceeds to step 225 where the coding challenge is graded.

At step 225, the coding challenge is graded by way of a set of grading parameters. The coding challenge grading comprises qualitative and quantitative data. The grading of the coding challenge is described in more detail below with respect to FIGS. 5 and 6. After all the coding challenge processes, the graders (manually or semi-automatically or automatically) post qualitative and quantitative feedback for each candidate's assessments following a standardized, selectable set of one or more forms. In one embodiment, the forms contain questions about the score for each judged item and also text fields for a description of any grader analysis dependent on each role to which the candidate is applying. Such text fields may contain an overall text, the positive and negative aspects, the decision as to certification, the resume and the English analysis.

The quantitative coding challenge grading may occur in any of several ways with varying levels of automation and types of automation.

In one approach or embodiment, a human vetting engineer performs all or most of the grading, albeit typically leveraging one or more objective measures of the candidates coding, e.g., measures of compile time and/or execution time. In other embodiments of coding challenge grading, automation is employed in whole or in part, the automation drawing or culling or accessing data as stored in the system database. Such data may include benchmark data from previously administered coding challenges to previous candidates undergoing similar evaluations.

The grading of the coding challenge may include automation algorithms that compare the candidate at bar with available historical data, and produce a relative measure of the candidate at bar. Such automation may also involve or include AI or other learning algorithms which undergo training based on access or review or culling of data contained in the system database of similar candidates similarly situated (meaning of similar skill set and/or applying for a similar position). For example, an AI tool will typically undergo initialization and/or recurrent training of its algorithms which typically involves review/study of historical use cases, as stored in the system database. (Note that automation engines or algorithms, such as AI engine(s), may be used for aspects of either or both of the coding challenge grading and the technical interview grading).

In any of the above approaches or embodiments of scoring of the coding challenge, one or more measures of the subject candidate's code are considered. Such measures may include one or more of the metrics or measures identified in FIG. 5.

With regard to the coding challenge quantitative data measured, any of several coding performance measures may be recorded and stored in system database for use by any of the above approaches (i.e., spanning wholly manual, partially automated to include with use of AI, and wholly autonomous to include with use of AI) and used in any combination. For each measure, a numerical score or value is generated, such a value later used, typically with a weighting, to access or gauge the candidate's coding challenge performance (such coding performance ultimately rolled-up into a technical candidate ranking value). The weighting of a score or value or measure associated with a particular performance test is a function of the complexity and/or category or performance test. The system database contains or stores or maintains a set of coding challenge quantitative data obtained from previous administrations of coding challenges, to include by similarly postured candidates (meaning candidates applying for similar job roles and/or with similar skill sets). These data are mapped or culled or accessed by the logic engine to provide, among other things, a relative score of the candidate at issue vs. similarly postured candidates (stated another way, a benchmarking activity). The data may also be used, e.g., as part of training of an AI engine.

A testing environment may be established or launched in which one or more tests may be performed against the candidate's test code, the candidate's test code comprising the implementation of one or more test code features.

An integration and/or endpoint test may be utilized which assesses whether the candidate's test code (herein referred to as "test code") properly interacts with or integrates with endpoints of the larger code. Such a test may be deemed an end to end (E2E) test, which may test if the test code is pixel perfect, if the interface or endpoint is working, etc. In one embodiment, the test results in a binary satisfy or not satisfy, meaning the test code either works (satisfies) integration with the endpoints or does not work (does not satisfy) integration with the endpoints.

A performance test may be used which is associated with compile time and/or execution time of the test code, and may be measured against a selected threshold value. For example, a threshold or baseline execution value for a particular test code challenge may be X msec; a test code that executes in X+Y msec would yield a performance score less than test code that executes in X−Y msec. (Note that all such threshold values may be selected by system operator or other authorized party and such values may be stored in system database or cloud). The test may be run multiple times and an average value computed.

A penetration test (aka pentest or pen testing) may be used which may be associated with a cyberattack simulation so as to discover any points of exploitation or vulnerability and/or test or measure breach security. The measure may be a numerical value relative to a benchmark or threshold, such as 1 to 10 with 10 no vulnerability and 1 readily penetrated. The measure may be a binary satisfy or not satisfy, meaning the test code either passes the pentest (satisfies) or does not pass (does not satisfy) the pentest. In one embodiment, negative labels or other annotations may be made (to a candidate's evaluation) for any security vulnerability identified.

A lint test may be used which measures the degree of linting. The term "lint" refers to the presence of suspicious constructs and non-structural code, such as programming errors, bugs, and stylistic errors. The measure may be a numerical value relative to a benchmark or threshold. The lint test and lint measure may be used as a candidate test code styling score or measure.

A User Interface (UI) test may be used which measures UI conformance of test code. As an example, the UI test may be associated with a visual test of the coding challenge. Suppose there is a button in the code, and the candidate is expected to modify it. This button is initially green and small, but the desired result from the candidate is for the button to be yellow and large. One may execute two units of tests here: one to test the color of the button, and the other to test the size of the button. Suppose the size is more important than the color, so one may assign 60% weight for the Button Color test, and 40% weight for the Button Size test. Suppose the candidate only changed the color and it works properly; when uploaded before processing and scoring, the candidate's score will be 6 out of 10.

Special algorithms may be employed as special tests, to include, e.g., listing of all candidate created files and folders and applying naming tests to detect design patterns of the candidate and employing a parser for any particular coding language. The use of a parser may allow, e.g., evaluation or detection of use of correct data types, evaluation or detection of use of expected classes or functions, evaluation or detection of use of incorrect or unnecessary coding styles, and/or evaluation or detection of memory leaks.

For each challenge and/or interview, one may define a set of attributes that need to be evaluated, and for each attribute a set of "achievements." For example, for a React Challenge attribute "Algorithm Quality," one may define achievements; achievements are things that one expects the candidate to do for a specific Attribute. For React-Algorithm Quality for example, one may expect the Complexity is $O(N2)$ or lower. Thus, if the candidate accomplishes this, one affirmatively marks this Achievement. The more achievements are checked the higher the score will be.

As in Attributes, one assigns a weight to each achievement. Once the grader finishes the achievement analysis, a final score is generated for this Attribute.

Any automated or semi-automated testing and scoring of the candidate's coding challenge may be supplemented by human scoring (such as by the system operator 181). This portion of the scoring of the coding challenge may be initiated as a result of a "ticket" being received that notifies the completion of the coding challenge by the candidate. A set of defined questions associated with the particular coding challenge test administered may then be considered. (The set of questions are stored in the system database and/or cloud and may be automatically culled or identified based on the, e.g., the defined skills assessment of step 218). For each question, a weighted value is assigned. (Such weighed values may be selectable by the system operator or may be automatically set based on any of several parameters, to include values or characteristics of the candidate, client requirements of step 208, skills assessment 218). A binary decision is entered as to if the candidate satisfies the question (the box is affirmatively checked) or does not satisfy the question (the box is not checked). A positive check results in a value being assigned to that question, aka a non-zero value being generated. Note that documentation as to each of the questions is assessable through query of the system database, the documentation detailing how to score each aspect of the challenge.

The roll-up of the coding challenge values described above is depicted in FIG. 6. The roll-up or generation of a composite coding score mat be a result of both quantitative (typically automated) scoring of the coding challenge with the qualitatively inspired scoring (and converted to numerical scores).

A human grader may assign a score to each of these attributes based on the candidate's performance. Each of these items have a different weight (see FIG. 6). For example, one gives less importance to Speaking and Code and Explanation than State Management/Data Management. Once the grader assigns the score to each attribute, an overall score is calculated automatically. All this process (attribute scoring and final score calculation) may be performed in a calculator build by way of the logic engine.

After all the coding challenge processes, a human grader may post qualitative and quantitative feedback for each candidate's assessments following a form. The form contains questions about the score for each item to judge; there are some text fields for grader analysis. The analysis depends on the role the candidate is applying. The analysis may include an overall text, the positive and negative aspects, the decision, the resume and the English analysis.

As mentioned above, for each challenge/interview a set of attributes that need to be evaluated by the grader are defined. A set of "achievements" are also defined. The achievements are items that we expect the candidate to do for a specific Attribute. For React-Algorithm Quality for example, one expects the Complexity to be $O(N2)$ or lower. If a candidate accomplishes this, this Achievement in the Achievements list is checked.

The set of coding challenge scores are grouped or quantized in categories or groups, such groups selectable (by e.g., the system operator 181) or automatically assigned or mapped by way of data stored in and retrieved from the system database (in all embodiments, references to system database may include completely or partially data stored in the cloud or any storage and access site known to those skilled in the art). The set of groups 620 of FIG. 6 are four (4) in number. The groups map to a larger set of key attributes 610. A numerical value associated with each group 620 describes attributes of content within the particular group. The score 640 is a score, which is typically a composite score, generated for a particular attribute 610. In this case, the candidate is not as proficient in testing the code (receiving a score of 7) as he is in task organization and planning (receiving a score of 9). The set of scores 640 (eight in number) are then, in a first overall score calculation, weighted equally to generate a first overall score 641 value of 6.75 (this is the sum if the set of eight scores (element 640) of 54 divided by the number of scores of 8 to yield 54/8=6.75).

An alternate second score calculation for the coding challenge uses equal weighting of the set of (eight) attributes, the weightings 630 ranging from 2 to 30 percent (of an overall maximum of 100). Each group 620 has its own weight 630, which allows a coding challenge composite score to indicate that the field of UI Design matching is more important (by a factor of 12) than the field of Task Organization because the former has a weight 630 of 24 vs. the later having a weight 630 of 2. The set of weights 630 add to 100 percent. The set of respective weightings 640 are then applied against the set of scores 640 to create a weighted score 632 by attribute. For example, the first attribute "speaking and code explanation" has a weight of 12 and a score of 4, resulting in 12×4=48 for a weighted score 632. The sum of the weighted scores 632 and then divided by 100 to yield a second overall score 631 of 5.94.

After completing step 225, the method 200 continues to junction 249, in which the method 200 pauses until step 235 is complete (alternatively, given the asynchronous nature of the two arms of evaluation, step 235 may be first completed and then the method 200 pauses until the completion of step 245).

Note that an Interview Attribute is the question from the list of questions, and to define the weight one uses the same reasoning as in the challenge weight definition.

At step 230, the technical interview is issued to the candidate. Like the issuance of the coding challenge at step 220, the candidate may be notified by any of several means, to include e.g., by text, email, etc., and is typically provided a link to a website to conduct the interview. The interview may be conducted as a one-way interview.

Note that the contents of the technical interview (e.g., the questions asked) may be automated or semi-automated. For example, an algorithm that takes demands from who is requesting and checks if the graders (humans) have already created all the questions necessary to build the interview. Suppose the interview about the technology A and B, when A is more important than B so that we could have, for example, 60 points of complexity to A and 40 to B. Then the automation will build the interview (with aid of and by interacting with or culling the system database) so as to join questions until the questions about A completes 60 points of complexity and 40 points about B.

Some or all aspects of the steps 230, 232, 235 may be automated or semi-automated, and may use data culled or stored or maintained in the system database. For example, the system database may store data associated with technical interviews of similarly postured candidates (akin to the coding challenge data from similarly postured candidates discussed above). These data may be used, for example, to compare or benchmark or grade a particular candidate against other candidates. Additionally, or alternatively, these data may be used to train an AI engine.

In one embodiment, an AI engine is used to analyze the answers given by a candidate. (In other embodiments, one or more other or alternate and/or additive AI engines that are capable of receiving and processing human communications, such as verbal communications, are used, such as those known to those skilled in the art). In order to use this model, one trains with the system database data described immediately above, the data comprising for example answers from previous interviews and the associated scores. In one embodiment, the performance of such automated grading is monitored and appraised by way of a set of performance metrics as displayed on a set of performance dashboards, as described below with respect to FIGS. 8A-D.

In one embodiment, the interview data (and/or the technical coding challenge data) are stored in system database, the system database being an object-relational database system to include an open source object-relational database system such as, e.g., a PostgreSQL database. Other database types are possible as known to those skilled in the art.

After completing step 230, the method 200 proceeds to step 232, where the candidate takes the technical interview. The video and audio of the technical interview are recorded. After completing step 230, the method proceeds to step 235 where the technical interview is graded.

Figure 7:
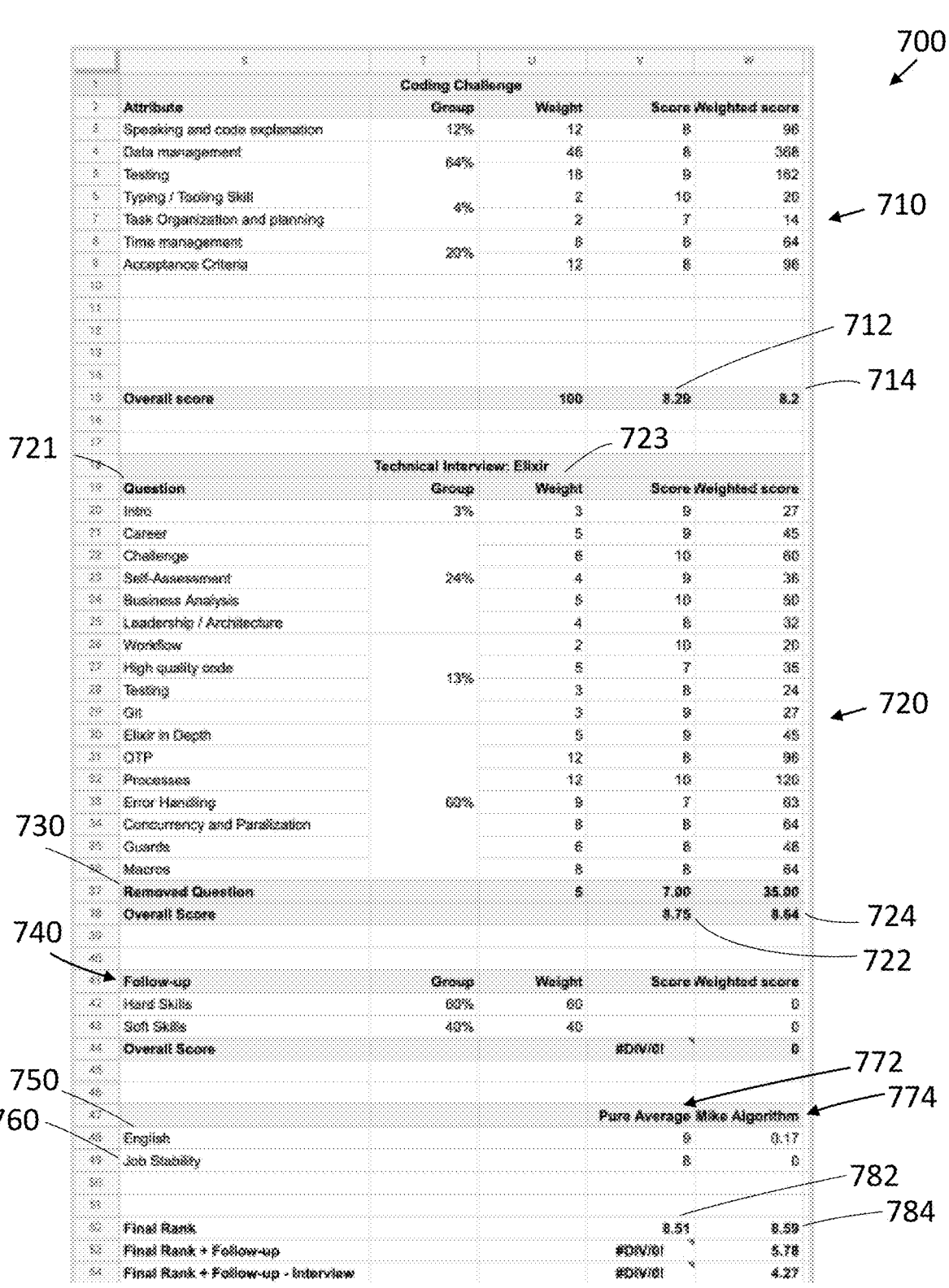
FIG. 7 is a depiction of one embodiment of certain scoring aspects associated with the overall consolidated technical candidate certification employee ranking value generated by the technical candidate certification system of FIG. 1.

With attention to FIG. 7, a summary of an administered technical interview is depicted in portion 720. A set of defined questions 721 associated with a particular technical interview are administered. (The set of questions are stored in the system database and/or cloud and may be automatically culled or identified based on the, e.g., the defined skills assessment of step 218). For each question, a weighted value 723 is generated. (Such weighed values may be selectable by the system operator or may be automatically set based on any of several parameters, to include values or characteristics of the candidate, such as candidate seniority of step 216, client requirements of step 208, skills assessment 218). Note that documentation as to each of the questions is assessable through query of the system database, the documentation detailing how to score each aspect of the challenge. A sum 722 (non-weighted, just a simple average) score (here, 8.75) is generated and a weighted score 724 of value 8.64. In some embodiments, selectable weighting (akin to the weighting discussed above with regard to the coding challenge) may be applied In one embodiment, at least some of the aspects of interview grading are automated, such as through AI models and/or LLM models (see FIGS. 3 and 4). For example, the candidate interview answers may be downloaded (after being digitized i.e., made into a transcript), the candidate answers may be compared to a database of similar interview answers from prior candidates. An AI model would train on these data and then provide an automated interview assessment or score.

In one embodiment, the audio of the technical interview is automatically transcribed. In one embodiment, the audio of the technical interview is run through a natural language processor or similar AI tool, generating measures of the candidate's speech, such as diction and grammar.

Note that each coding challenge or technical interview has its own score mapping table, so the technical vetting engineer must adhere to a guideline regarding how to obtain the correct score for each field on the feedback form in order for personnel (e.g., a vetting engineer) to post the candidate's feedback.

As mentioned above, once the set of two asynchronous evaluations are completed (that is, the two evaluations reach node 249), the method 200 proceeds to step 250.

At step 250, the overall weighting and consolidation of the set of above-described scores (along with a language proficiency measure as described below) are amalgamated to generate a technical staff ranking value for the particular candidate at issue.

Figure 3A:
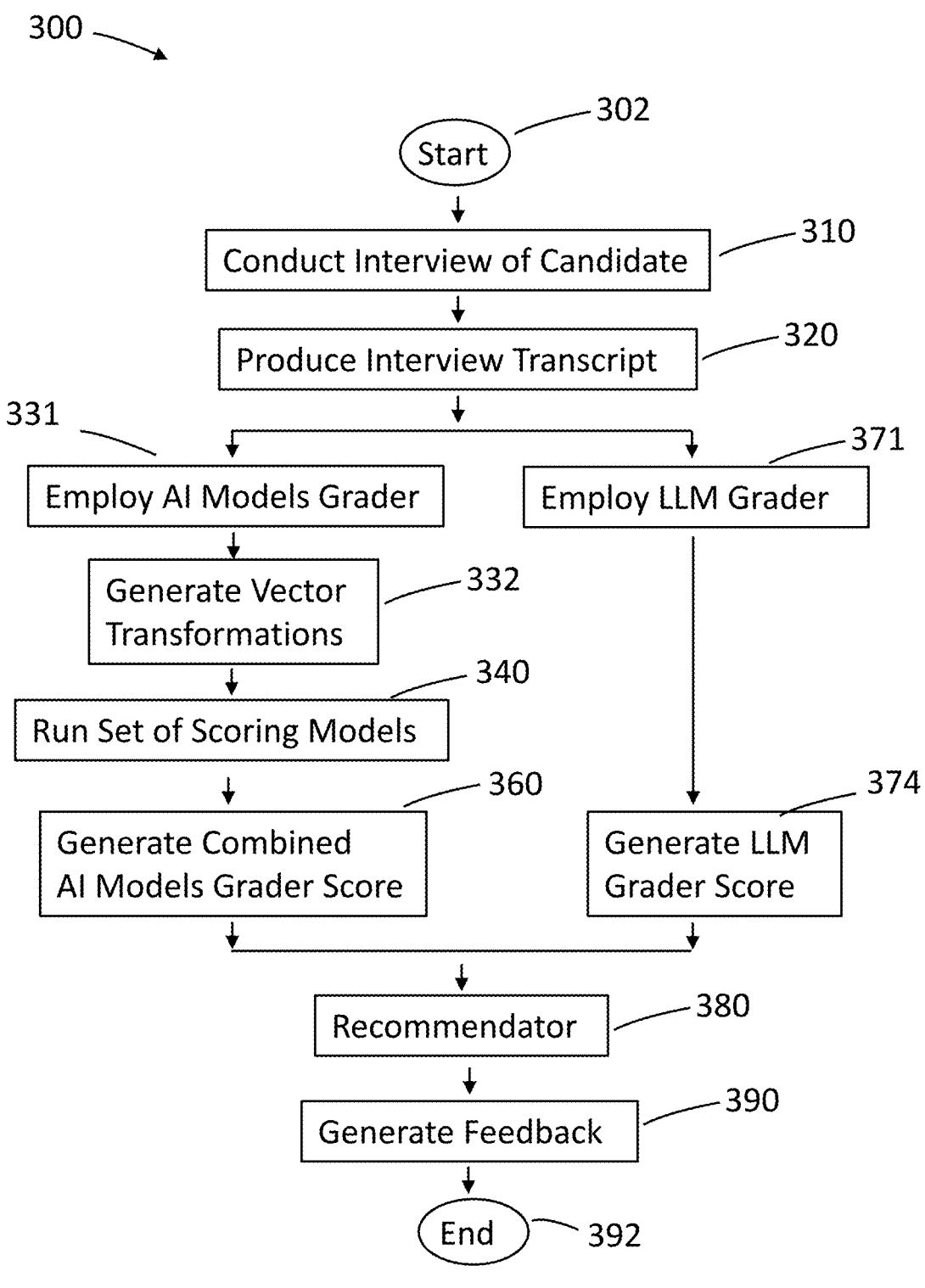
FIG. 3A is a schematic flow chart of one embodiment of the technical interview component of the technical candidate certification system of FIG. 1.
Figure 3B:
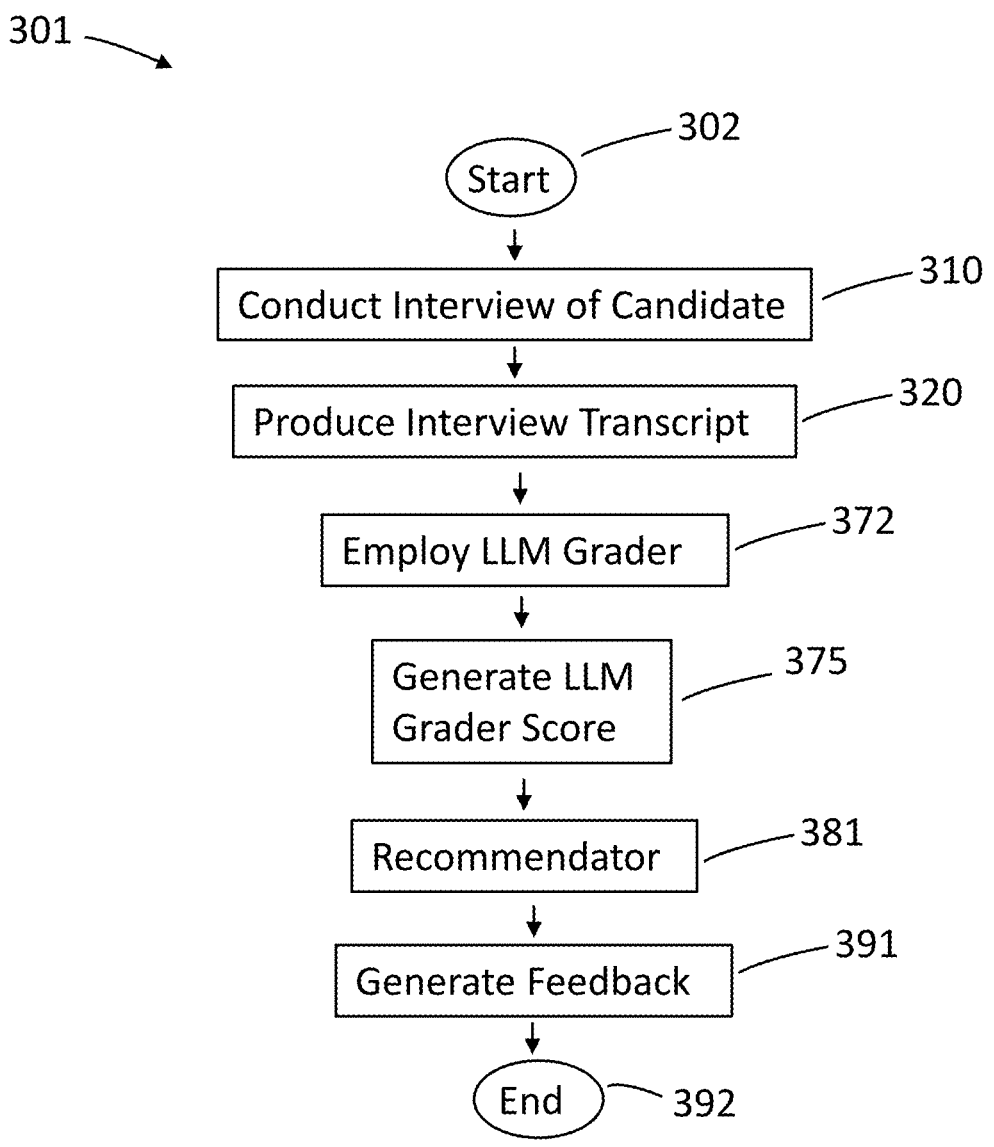
FIG. 3B is a schematic flow chart of another embodiment of the technical interview component of the technical candidate certification system of FIG. 1.

FIGS. 3A-B and 4 provide various alternate embodiments and description of the technical interview component of a technical candidate certification system.

FIG. 3A is a schematic flow chart of one embodiment of a method of use 300 of the technical candidate interview system of FIG. 2. Note that in some embodiments, some functions or steps may be absent, occur in a different order, or include other functions or steps not shown. The method 300 will reference aspects of the technical candidate interview system 200 of FIG. 2, as well as aspects of components or elements of the technical candidate interview system as described in FIGS. 4A-B, 5, and 6.

The technical candidate interview system method 300 of FIG. 3 begins at step 302 and ends at step 392. After starting at step 302, the method 300 proceeds to step 310.

At step 310, a technical interview of the candidate is conducted. The candidate is presented with a set of technical interview questions, such questions culled or selected from a set of questions which may be stored in the system database 120. The interview is recorded, i.e., an audio recording is made of the technical interview to create technical candidate interview audio data in response to the set of technical interview questions. The set of technical interview questions poised or asked are cataloged or mapped or identified or associated with the corresponding answer from the candidate. After completing step 310, the method continues to step 320.

At step 320, a transcription of the audio recording of the technical interview is created by the processor 112. Stated another way, the processor 112 digitally transcribes the technical candidate interview audio data into a set of transcribed technical candidate interview answers mapped to the set of technical interview questions. After completing step 320, the method continues to one or both of steps 331 and 371. (The system operator may select which or both of steps 331 and 371 to engage).

At step 331, the system employs an AI Models grader, thereby proceeding though steps 332, 240, and 360. After completing step 331, the method continues to step 332, wherein a set of vector transformations of the set of transcribed audio responses of the candidate are generated. The set of vector transformations, among other things, are used as input to the set of scoring models. Details of the vector transformation definition and process are provided below. After completing step 332, the method continues to step 340 wherein each of the set of scoring models are run or executed (see FIG. 4 for additional description of the scoring models). The scoring models receive as input the vector transformed, transcribed technical interview answers generated at step 330. Stated another way, the transcribed technical interview answers are transformed into a vector representation (in one embodiment, the vector representations are embeddings produced by OpenAI) and provided to the set of scoring models. Each scoring model generates at least one scoring model score. After completing step 340, a combined AI Models grader score is generated, and the method 300 continues to step 380. In one embodiment, the combined AI Models Grader score is between 1 and 10.

If step 371 is engaged, the method proceeds at step 371 to employ an LLM grader and, at step 374, to generate an LLM grader score at step 374. In one embodiment, the LLM grader score is between 1 and 5, and may be normalized to a score between 1 and 10. After completing step 374, the method 300 continues to step 380.

At step 380, the recommendator module considers the combined AL Model grader score and the LLM Grader score to output a certification recommendation. In one embodiment, the recommendation is a binary positive or negative certification (meaning, the candidate is or is not respectively recommended to hire, based on the technical interview; note that overall certification follows the larger method of FIG. 2 which considers additional aspects, such as coding challenge). In one embodiment, the recommendator module combines scores using a linear regression. In one embodiment, an additional output tranche of "review" is available, meaning further review is required to determine certification level. In one embodiment, a score is provided by each of the AI Models Grader and LLM Grader; a decision is then made as to which score to use what recommendation (certification) to make. Based on training metrics, one may define different selectable thresholds that allow one to choose between the two scores and make a final recommendation. A final recommendation may be, in one embodiment: Hire, No-Hire, or Review. Hire and No-Hire explain themselves. In the case, and based on the thresholds, one does not sufficient confidence in the scores generated by the AI Models and the LLM, then a Review is recommended (meaning a human must fully evaluate the interview).

After completing step 380, the method 300 proceeds to step 390 wherein feedback (to the candidate and/or the system operator) is generated. The feedback with respect to the candidates' responses to the set of interview questions is provided. The feedback may include feedback on an individual question basis and/or on the overall candidate response to the set of questions. The feedback may use any of several techniques, to include by way of a linear regression model. The feedback may be derived from three (3) main elements: the posed question, the candidate's response, and the most analogous answer to that question from the system database 120. In one embodiment of the technical candidate interview scoring system, the feedback may be determined or identified by searching the system database of historical feedback given the candidate's combined score and the candidate's set of technical answers to locate a best match feedback, then providing that feedback to the candidate. Such searching may be aided or enabled by performing a vector analysis of the candidate's set of responses. After completion of step 390, the method 300 proceeds to step 392 and the method ends.

Note that the training of the scoring models occurs (as used at step 340) during a system development or initialization phase, and not during operation of the system to perform automated grading.

The training of any one or more scoring models may, in one embodiment, include vector analysis, such vector analysis may involve cosine similarity. (Also, note that system health metrics are monitored to ensure system performance and, for example, to determine when additional or alternate training of a model may be required). Details of vector analysis are provided below. Generally, a set of vectored technical candidate interview answers are graded for similarity to the particular set of historical vectored pairing data associated with the set of technical interview questions to create a set of similarity grades.

As briefly discussed above, the training of one or more of the scoring models may employ a vector-based approach to assess the responses of a candidate to a set of technical questions. Each candidate answer is transformed into a numerical vector representation. By representing answers as vectors, one may determine how closely an answer to a given question aligns with another answer to the same question. In essence, the degree of similarity between these vectors acts as a proxy for how similar the actual answers are. In the technical candidate interview system, a candidate's answer to each of a set of technical questions are compared, through a vector-based approach, to one or more historical answers to the same question, such historical answers stored in the system database 120. Stated another way, the vector-based representation of a candidate's answer to a given question is compared to a historical or exemplar answer to the same question. Each of the candidate's answers is mapped to or associated with a particular question, and may be termed a vectored pair. Similarly, a particular historical answer is mapped to or associated with a particular question and may be termed a historical vectored pair. Note that a particular historical answer may be a composite answer from a plurality of historical answers (such historical answers obtained, e.g., from other candidates' answers), and/or from human evaluations. In this way, the relatedness of text strings (such as answers to particular questions) may be compared and the particular scoring model learns or trains on the mapping and/or numerical values of relatedness generated.

Any of several software tools may be used to create the vector-based representation of a candidate answer and/or a historical answer, as associated with a particular technical question.

Any of several techniques may be used to compare similarity or relatedness of the text strings involved, i.e. the candidate answer and the historical answer. Generally, in a vector-based approach, the distance between two vectors measures their relatedness. Small distances suggest high relatedness and large distances suggest low relatedness.

In one embodiment, the cosine similarity technique is used to assess and provide a measure of the relatedness of two vector-represented answers. (Cosine similarity is a measure of similarity between two non-zero vectors defined in an inner product space. Cosine similarity is the cosine of the angle between the vectors; that is, it is the dot product of the vectors divided by the product of their lengths. It follows that the cosine similarity does not depend on the magnitudes of the vectors, but only on their angle. The cosine similarity always belongs to interval [−1,1]. For example, two proportional vectors have a cosine similarity of 1, two orthogonal vectors have a similarity of 0, and two opposite vectors have a similarity of −1. Other names for cosine similarity include Orchini similarity and Tucker coefficient of congruence). FIG. 3B is a schematic flow chart of another embodiment of a method of use 301 of the technical candidate interview system of FIG. 2. Note that in some embodiments, some functions or steps may be absent, occur in a different order, or include other functions or steps not shown. The method 301 is very similar to that of the method 300, except that the method 301 exclusively uses or employs an LLM grader (at step 371) without use or engagement of any AI Models graders.

The technical candidate interview system method 301 of FIG. 3B begins at step 302 and ends at step 392. The method 301 proceeds through step 302 to step 310 to step 320 akin to identically numbered steps as described in method 300 of FIG. 3A. After completing step 320, the method 301 proceeds to step 372 wherein an LLM grader is employed to generate an LLM grader score at step 375. In one embodiment, the LLM grader score is between 1 and 5, and may be normalized to a score between 1 and 10. After completing step 375, the method 300 continues to step 380.

At step 381, the recommendator module considers the LLM Grader score to output a certification recommendation. In one embodiment, the recommendation is a binary positive or negative certification (meaning, the candidate is or is not respectively recommended to hire, based on the technical interview; note that overall certification follows the larger method of FIG. 2 which considers additional aspects, such as coding challenge). In one embodiment, an additional output tranche of "review" is available, meaning further review is required to determine certification level. In one embodiment, the scores provided by the LLM Grader are passed to the "LLM Only) Recommendator 381 and, depending on the degree of confidence in the scores provided by the LLM Grader, a recommendation of Hire, No Hire, or (Human) Review is provided.

After completing step 380, the method 300 proceeds to step 390 wherein feedback (to the candidate and/or the system operator) is generated. The feedback with respect to the candidates' responses to the set of interview questions is provided. The feedback may include feedback on an individual question basis and/or on the overall candidate response to the set of questions. After completing step 381, the method 301 proceeds to step 391.

At step 391, similar to the step 390 of method 300, the feedback may use any of several techniques, to include by way of a linear regression model, as described with respect to step 390 of method 300. After completion of step 391, the method 300 proceeds to step 392 and the method ends.

FIG. 4 is a schematic flow chart of aspects of the technical candidate interview scoring system. The system 400 of FIG. 4 presents similar functional elements or components to the system 300 of FIG. 3A, to include a conduct interview element 410, an Employ AI Models Grader 431 element, an Employ LLM Grader element 471, and a recommendatory 480 element. FIG. 4 shows in detail one embodiment of the technical candidate interview scoring system 400 which uses four (4) Scoring Model components (441, 442, 443, and 444) that produce individual scores that are combined at element 460 to produce a combined score. The scoring components may employ or leverage a platform, software, and/or models of: Neural Network Regression (e.g., by TensorFlow), XGB Regression and Classification (e.g., by XGBoost), K-mean (e.g., by SciKit learn), and LGBM aka Light GBM or light gradient-boosting machine. In other embodiments, more or less than four (4) Scoring Model components may be employed. In other embodiments, no Scoring Models are employed, and instead, as described with respect to method 301 of FIG. 3B, solely an LLM Grader is employed.

Any of several techniques may be used to generate the combined score from the set of Scoring Model Scores. In one embodiment, the combined score is based on a linear regression model that uses the set of Scoring Models as inputs. Note that "linear regression" is a statistical model that estimates the linear relationship between a scalar response and one or more explanatory variables. Note that by blending the probabilistic outputs of multiple vector analysis models with grades from the most analogous past answers, a composite scoring mechanism is created that, among other things and for example, enhances performance and provides an adaptable scoring function.

To assess the performance of the technical employee certification system, it may be necessary to generate metrics that indicate system accuracy. FIG. 8A presents one embodiment of a development dashboard for the technical candidate certification system of FIG. 1. FIGS. 8B-D present portions of one embodiment of monitoring dashboards for the technical candidate certification system of FIG. 1.

The FIGS. 8A-D are presented for one selectable AI model or AI engine, but could alternatively be presented for a selected set of AI Engines (such as, e.g., the set of AI Engines or AI Models of FIG. 4).

In one embodiment, during the AI Grading system development process, the interviews evaluated by humans are compared with those provided by AI; thus, one may measure the error between the expected value (human score) and the obtained value (AI score). Metrics used may include the root mean square error (RMSE) and the number of disagreements (when the AI gives a Hire and the human gives a No Hire, and vice versa). Such metrics may be generated for each technology evaluated (a "technology" here means a technical skill being evaluated, e.g. java or python software programming languages) and each model, whether it is an AI model or an LLM, and for the entire technical candidate certification system. Metrics dashboards may be used to more readily observe or monitor performance metrics; e.g., one dashboard for the development stage (such as that of FIG. 8A) and another set for the post-deployment stage (such as that of FIGS. 8B-D).

With attention to FIG. 8A, the development stage dashboard 800 allows one to decide if the system is capable of evaluating a technology if it has reached the acceptable minimum error. Each model, such as an AI model or an LLM model, is assessed a human generated "observed" score for a particular technical candidate in a particular technology skill. For example, a particular AI model may be run against transcribed interview answers to a set of interview questions in a given technology area, and the model generated scores for each of those answers are compared against a score from

US 12,619,941 B2

3

24 a human grader. The two scores (the AI model score and the human score) are compared in any of several ways, such as by root mean square error (RMSE). RMSE provides a measure of how well a model's prediction of a set of scores matches a set of observed scores (here, the observed scores are those of a human scorer). The RMSE represents the square root of the variance of the residuals, which are the difference between the model scores and the observed scores. The lower the RMSE, the better a given model is able to "fit" a dataset.

The dashboard 800 shows sample results of a particular model in predicting candidate scores in a set of technology skill areas (column 801) against (human) observed scores. The overall RMSE is presented in column 810. Columns 811, 821, 822, 823, and 824 present tranches of RMSE values for a particular technology skill. Specifically, column 821 presents a percentage of model scores that have an RMSE below 0.25, column 822 an RMSE below 0.5, column 823 an RMSE below 0.75, and column 824 are RMSE above 0.75. Column 811 presents the RMSE of appraised candidates with scores (on a 1-10 scale) that were between 6.5-7.5. In the case where no candidates fell within the 6.5-7.5 tranche, a "NULL" value is displayed. Note that the tranche range and values of 6.5-7.5 is selectable be a user.

Column 840 shows the number of candidates used for the evaluation of the particular model against the particular technology. For example, for the Angular technology, 16 candidates were considered. Columns 841 and 842 show the respective number of considered candidates that the model recommended for hire and no hire. For the Angular technology, these data are respectively 10 and 2 (and thus 16–(10+2)=4 candidates are recommended for human review). Column 833 presents the percentage of considered candidates that are recommended for human review (for the Angular example, this would be 4/16 or 0.25=25%). Lastly, columns 831 and 832 present respectively the percentage (as a decimal percentage) of to hire recommendations by the particular model that agree with the observed (human) determination and the percentage (as a decimal percentage) of not to hire recommendations by the particular model that agree with the observed (human) determination (for the Angular technology, these data are 0.56 and 0.19).

With attention to FIGS. 8B-D, a set of portions of a system health dashboard are depicted. Such a collection of displays allows one to measure and monitor the health of the current version of the system; scores given by humans to the candidates are again compared (as described in other scenarios, such as in FIG. 8A) with those determined by a particular AI system or AI engine. Other metrics are also analyzed, such as the statistical distribution of the scores, and the average score per technology of the AI vs. Human.

When the scores from the LLM and AI Models are obtained, a decision must be made regarding which one to use. Such a confidence assessment is determined through an analysis of the development metrics. In one embodiment, one may determine that for technology X, when the LLM gives a score higher than S, then the error reaches the expected value of 0.5 or less. This means that we can be certain that if the LLM gives a candidate a score higher than S, then the Human will give a similar score. Therefore, the distribution of errors is analyzed in different score ranges. This same procedure may be applied to the scores given by the AI models. In the case that none of the given scores provides a degree of confidence, or both given scores are within the confidence ranges, but these are contrary (Hire vs No-Hire), the candidate is passed for additional human review. The upper portions of each of FIGS. 8B-D (respective portions 851, 861, and 871) present a series of bar charts that illustrate how well a given AI model performed when appraising a set of candidates' skill in a set of technology skill areas, the performance compared against a set of three other types. Display 851 shows a decimal percentage of candidates evaluated that were recommended for hire (the y-axis 852) for each of a several technology areas (the x-axis 853). Display 861 shows a decimal percentage of candidates evaluated that were recommended for no hire (the y-axis 862) for each of a several technology areas (the x-axis 863). Display 861 shows a decimal percentage of candidates evaluated that were recommended for (human) review (the y-axis 872) for each of a several technology areas (the x-axis 873). The technology skill areas are shown as, e.g. ".NET," AI/ML," etc.

A series of displays (851, 861, 871) are generated from various metrics to gauge and to monitor the AI system in both an AI system deployed version and an AI system development version. Such system health displays are presented against a set of skill technologies (e.g., Python, ROR, etc.). The AI generated vertical bar result (identified as "AI-GRADED") is the result of running the deployed (aka operational or live) version of a particular AI system for a set of candidates. The "Test set" vertical bar result is the result of human grading of a set of candidates before the particular AI system is deployed, meaning the AI system is a development version (and may be undergoing AI training). In display 855 of FIG. 8B, the RMSE is generated by comparing these human graded values against the development version AI system. The "after_deploy_graders" vertical bar is the result of human grading of a selected set of candidates after the particular AI system is deployed, meaning the AI system is in a deployed version. In display 866 of FIG. 8C, the RMSE is generated by comparing these human graded values against the deployed AI system. The "After deploy" vertical bar is the result of AI system grading of the same selected set of candidates as the "after_deploy_graders" vertical bar. In display 876 of FIG. 8D, the RMSE is generated by comparing human graded values against the deployed AI system for a selected set of human graders.

The lower portions of each of FIGS. 8B-D (respective portions 855, 865, and 875) present a series of tables that are derived from the data presented in the upper portions of each of FIGS. 8B-D (respective portions 851, 861, and 871) and illustrate how well the given AI model performed (and/or human with respect to an AI model—see descriptions below) when appraising the set of candidates' skill in a set of technology skill areas.

In the lower portion of FIG. 8B, the display 855 provides the RMSE (column 858) for the performance of the given AI model (here, as described above, a development version AI system) for the given technology skill area (column 856) for the numbered set of candidates (column 857). Column 859 provides the RMSE for candidate with scores between 6.5-7.5. (as explained above with respect to FIG. 8A). For example, the AI Model, when evaluating a set of 9 candidates for the Python technology skill area, provided an RMSE of 0.41.

In the lower portion of FIG. 8C, the display 865 provides the RMSE (column 868) for the performance of the given AI model (here, as described above, a deployed AI system) for the given technology skill area (column 866) for the numbered set of candidates (column 867). Column 869 provides the RMSE for RMSE 6.5-7.5. For example, the AI Model, when evaluating a set of 24 candidates for the Angular technology skill area, provided an RMSE of 0.68.

In the lower portion of FIG. 8D, the display 875 provides the RMSE (column 878) for the performance of the given AI model (here, as described above, a deployed version AI system) for the given technology skill area (column 876) for the numbered set of candidates (column 877). Column 879 provides the RMSE for RMSE 6.5-7.5. For example, the AI Model, when evaluating a set of 11 candidates for the .NET technology skill area, provided an RMSE of 0.57.

FIGS. 5 and 6A-C provide additional description of the coding challenge components and/or steps identified above. FIG. 5 is a schematic flow chart of one embodiment of a method of use of the coding challenge component of a technical candidate certification system. FIGS. 6A-C are depictions of certain scoring aspects associated with a coding challenge component of the technical candidate certification system.

The coding challenge method 500 of FIG. 5 begins at step 502 and ends at step 592. Note that in some embodiments, some functions or steps may be absent, occur in a different order, or include other functions or steps not shown. After starting at step 502, the method 500 proceeds to step 504 where coding challenge instructions are provided along with notional coding files. The challenge instructions are contained in a document that specifies the features that the candidate must complete and fix and the instructions on how can download the challenge. The challenge consists of a fake mini-project that has broken and missing features. Candidates download the project to their computers, and then must add the required features defined in the instructions and fix the broken ones. A specific set of files the candidates need to update in order to do so is defined; these are the files that will be used in the analyses during the grading process. The content of the project depends on the technology that is being evaluated. If the candidate is being evaluated for Java, for example, the project will consist of an app built in this language. After completing step 504, the method continues to step 510.

At step 510, the coding challenge is administered. The candidate user receives a set of notional coding files and edits the files to create updated coding files. Among other things, the updated coding files satisfy requirements presented in the coding challenge and fix errors or bugs residing in the notional coding files. After completing step 510, the method 500 proceeds to step 514.

At step 514, the candidate's verbal comments are recorded and transcribed. The candidate is encouraged if not required to verbally comment while performing the coding challenge, which, among other things, provides insight into the thinking processes of the candidate. After completing step 514, the method 500 proceeds to step 516.

At step 516, the system receives the candidate's set of new coding files and the set of updated coding files. After completing step 516, the method 500 proceeds to step 518. At step 518, the method 500 executes or runs the set of new coding files and the set of updated coding files. After completing step 518, the method 500 proceeds to step 520.

At step 520, after the system receives the updated coding files, the system processor performs a set of code evaluations or coding tests. In one embodiment, the tests include: code analysis, AI analysis, lint analysis, and automated test element, as described in more detail below. (In some embodiments, a different set and/or number of code evaluations are employed). Each of these four evaluations produce or output or calculate or generate at least one evaluation score. After completing step 520, the method 800 proceeds to step 530.

At step 530, the processor generates or calculates a set of code evaluation scores based on the set of tests (performed in step 520) and based on a set of system operator scoring parameters (described below). The calculations of the set of code evaluation scores are described below. After completing step 530, the method 500 proceeds to step 592 and the method ends.

The four coding tests (code analysis, AI analysis, linter analysis, and automated test element) of element 520 of FIG. 5 will now be described in more detail.

Code Analysis Category of Coding Tests and Scoring

Any of several code analysis systems may be employed. In one embodiment, SonarQube is employed, which is a service/software that performs code analysis, e.g. code quality analysis like good practice (code smells) or vulnerabilities (security). The evaluation may include code smells in the project (e.g., multiple nested if portions, callback hells) and security issues which may include insecure code. Metrics used may include: code smells, vulnerabilities, reliability, and duplication. Each metric counts the number of faults found in the candidate's code for the given criteria. In one embodiment, only medium and high-priority faults are counted. These metrics are obtained for the candidate source code and test code implemented.

In order to calculate the Main Code Analysis Score, one first calculates the code Smells Score, Vulnerabilities Score, and Reliability Score for the Source Code implemented by the candidate.

The source code smells score ("CSCSmellScore") is calculated via assigning points for five score bands: 10 errors or more receive 0 points; 8-10 errors receive 0.85 points; 4-7 errors receive 1.15 points; 1-3 errors receive 1.45 points, and 0 errors receive 0.55 points. The points are accumulated. If a candidate gets 5 errors, for example, the score will be CSCSmellScore=1.15+1.45+0.55, where the 1.15 is the 4-7 error score band, the 1.45 is the 1-3 score band, and the 0.55 is the 0 score band.

The source code vulnerabilities score ("CSCVulmScore") is calculated via assigning points for five score bands: 7 errors or more receive 0 points; 6 errors receive 0.6 points; 4-5 errors receive 0.9 points; 1-3 errors receive 1.2 points; and 0 errors receive 0.3 points. The points are accumulated. If a candidate gets 2 errors, for example, the score will be CSCVulnScore=1.2+0.3, where the 1.2 is the 1-3 error score band, and the 0.3 is the 0 score band.

The source code reliability score ("CSCRelScore") is calculated via assigning points for five score bands: 5 errors or more receive 0 points; 4 errors receive 0.6 points; 3 errors receive 0.6 points; 1-2 errors receive 1.2 points; and 0 errors receive 0.6 points. The points are accumulated. If a candidate gets 2 errors, for example, the score will be CSCRelScore=1.2+0.6, where 1.2 is the 3 error score band, and 0.6 is the 0 score band.

With the scores above one may calculate the MainAnalysisScore as:

$$MainCodeAnalysisScore=CSCSmellScore+CSCVulnScore+CSCRelScore$$

The Test Code Analysis Score is calculated by first calculating the Smells Score, Vulnerabilities Score, and Reliability Score for the Todo Tests implemented by the candidate. The Todo code smells score("TTSmellScore") is calculated via assigning points to five score bands: 9 errors or more receive 0 points; 8 errors receive 0.85 points; 4-7 errors receive 1.15 points; 2-3 errors receive 1.45 points; and 0 errors receive 0.55 points. The points are accumulated. If a candidate gets 2 errors, for example, the score will be TTSmellScore=1.45+0.55, where 1.45 is the 2-3 error score band, and 0.55 is the 0 score band.

The Todo test code vulnerabilities score("TTVulnScore") is calculated via assigning points to five score bands: 7 errors or more receive 0 points; 6 errors or more receive 0.6 points; 4-5 errors receive 0.9 points; 2-3 errors receive 1.2 points; and 0 errors receive 0.3 points. The points are accumulated. If a candidate gets 2 errors, for example, the score will be TTVulnScore=1.2+0.3, where 1.3 is the 2-3 error score band, and 0.3 is the 0 score band.

The Todo test code reliability score ("TTRelScore") is calculated via assigning points to five score bands: 5 errors or more receive 0 points; 4 errors receive 0.6 points; 3 errors receive 0.9 points; 1-2 errors receive 1.2 points; and 0 errors receive 0.3 points. The points are accumulated. If a candidate gets 2 errors, for example, the score will be TTRelScore=1.2+0.3, where 1.3 is the 1-2 error score band, and 0.3 is the 0 score band.

With the scores above one may calculate the TestCodeAnalysisScore as:

$$TestCodeAnalysisScore=TTSmellScore+TTVulnScore+TTRelScore$$

A duplication code analysis score is calculated for the whole project. The code duplication score ("CDupScore" is calculated via assigning points to five score bands: score greater than 0.2 receives 0 points; a score greater than 0.15 and lower or equal to 0.2 receives 5 points; a score greater than 0.1 and lower or equal to 0.15 receives 2 points; a score greater than 0 and lower or equal to 0.1 receives 2 points; and a score equal to zero receives 1 point. The points are accumulated. If a candidate gets a score of 0.14, for example, the score will be CDupScore=2+2+1, where the first 2 is the [0.1-0.15] score band, the second 2 is the [0-0.1] score band, and the 1 is the 0 score band.

A code analysis final score may now be calculated as: CodeAnalysisFinalScore=(0.75)×MainCodeAnalysisScore+(0.2)×TestCodeAnalysisScore+(0.05)×CDupScore

AI Element Category of Coding Tests and Scoring

Any of several AI evaluation systems may be employed. In one embodiment, OpenAI Chat LLM is employed to evaluate the candidate's Source Code and Todo Test implemented. The AI engine is instructed to grade the source code and the todo tests. Each of the files updated by the candidate are evaluated. Specifically, the areas evaluated are: i) how good the candidate's solution is, based on the problem description, ii) code organization, readability, and logic, and iii) adherence to coding best practices, naming conventions, and style guides.

The AI is instructed to provide a score between 1-10 for each coding file evaluated. The AI Score (which will be factored in against the other three coding scores) is a simple average of all of the AI scores for each candidate coding file.

Linter Category of Coding Tests and Scoring

A linter is a tool that analyzes source code to flag programming errors, bugs, stylistic errors, and suspicious constructs. Linters are designed to help maintain a consistent coding style, adhere to best practices, and catch common errors before runtime. A linter works by parsing the code and applying a set of predefined rules or patterns to identify potential issues. These rules can cover syntax errors, potential semantic issues, code format and style guidelines, and more complex patterns that could lead to errors or inefficient code.

A commercially available linter tool is employed and set to assign points by one of five error bands. Specifically: 7 errors or more receive 0 points; 6 errors receive 2 points; 4-5 errors receive 2 points; 1-3 errors receive 4 points; and 0 errors receive 2 points. The points are accumulated. If a candidate gets 3 errors, for example, the score will be Lunter Score=2+2+4. Where the first 2 is the 6 error score band, the second 2 is the 4-5 score band, and the 4 is the 1-3 score band.

Automatic Test Category of Coding Tests and Scoring

Each challenge project has a set of automated tests. An Automated test is software that automates the process of validating the functionality of another software and ensures it meets requirements. In our case, the automated test will ensure that the features of the project behave as expected. Each test exercises a particular feature and scenario (branch). If the test passes, then the feature for the given scenario was implemented correctly. If the test does not pass, the feature for the given scenario has a bug.

Three types of tests are used: broken tests, todo tests, and internal tests. Broken tests are test that are implemented correctly; however, they are not passing because the features these tests are exercising have not been implemented. If the candidate implements these tests correctly, then the tests will pass. Todo tests are included in the project but have not been implemented. The candidate's job is to implement these and make it pass by adding the missing features. Internal tests are tests that are not visible to the candidate. Such tests are used during the grading process to validate that the candidates implemented the feature correctly. These tests are different from the others because they test more scenarios for the features the candidates are implementing.

Tests Coverage

Test coverage is a metric used to evaluate the effectiveness of a testing process in software development. It measures the extent to which the source code of a program is executed when the test suite runs. This metric is often expressed as a percentage, indicating the proportion of the codebase that has been tested. The goal of test coverage is to identify untested parts of the codebase to ensure thorough testing. Two coverage metrics are used: branch coverage and line coverage. Branch Coverage: Measures the percentage of branches (e.g., if-else conditions) that have been executed, ensuring that each possible route through a given part of the code is tested. Line Coverage: measures the percentage of lines of code that have been executed in the source code.

Score Generation

The project tests are run automatically when the candidate submits the coding challenge; each test can pass or fail. A coverage tool is also run to obtain the branch and line percentage metric. With these data, test scores are calculated as follows below.

Candidate Test Score ("CTScore)

A Candidate Test is defined as any Broken or Todo Test in the project. Each Candidate Test (T) is assigned a weight (W). We have N Candidate Tests.

T(n): returns the Candidate Test result.: 0 if the test did not pass, 1 if it passes W(n): returns the weight of the test n. The sum of all weights must be equal to 10.

$$CTScore = T(1)*W(1) + T(2)*W(2) .... + T(n)*W(N)$$

CTScore will be a number between 0 to 10.

Coverage Test Score ("CovTScore")

The CovTScore is calculated based on a branch coverage score and a line coverage score.

The branch coverage score ("BCovScore") is calculated via assigning points to three possible branch coverage percentages: 20% results in 1 point; 40% results in 2 points; and 50% results in 1 point. The points are accumulated. If a candidate gets 40% of branch coverage, one provides 1 point for the 20% and 2 for the 40%. This means the candidate will get a 3 for the BCovScore.

The line coverage score ("LCovScore") is calculated via assigning points to three possible line coverage percentages: 70% results in 3 points; 80% results in 2 points; and 90% results in 1 point. The points are accumulated. If a candidate gets 80% of branch coverage one provides 3 points for the 70% and 2 for the 80%. This means the candidate will get a 5 for the LCovScore.

With the above scores, one may calculate the CovTScore as follows:

CovTScore=BCovScore+LCOvScore

Fixed Coverage and Tests Scores

Fixed Candidate Test Score (FCTScore):

FCTScore=0; IF CovTScore<=4

FCTScore=CTScore; IF CovTScore>4

Fixed Coverage Test Score (FCovTScore):

FCovTScore=0; IF CTScore<=2

FCovTScore=CovTScore; IF CTScore>2

The candidate's test score (CFTScore) is calculated as follows:

CFTScore=(FCTScore+FCovTScore)/2Each Internal Test (T) is assigned a weight (W). We have N Internal Test.

T(n): return the Internal Test result. 0 if the test did not pass, 1 if it passes W(n): returns the weight of the test n. The sum of all weights must be equal to 10.

$$ITScore = T(1)*W(1) + T(2)*W(2) .... + T(n)*W(N)$$

ITScore will be a number between 0 to 10.

Final Technical Candidate Software Coding Score

In one embodiment:

$$ChallengeFinalScore = 0.2*CFTScore +$$
$$0.4*ITScore + 0.1*LinterScore + 0.3*CodeAnalysisFinalScore$$

In another embodiment:

$$ChallengeFinalScore =$$
$$0.8*[0.2*CFTScore + 0.4*ITScore + 0.1*LinterScore +$$
$$0.3*CodeAnalysisFinalScore] + 0.2*AIScore$$

FIG. 7 presents scoring aspects associated with the overall consolidated technical candidate ranking value generated by the technical candidate ranking system of FIG. 1. The set of measures or grades or scores associated with a coding challenge of a technical candidate are presented in FIG. 7 as a consolidated scoring summary 700.

Area 710 describes the results of a coding challenge, similar to that described in FIG. 6, to include a baseline (non-weighted) scoring scheme with an overall score 712 of 8.29 and a weighed scheme with an overall score 714 of 8.2.

Area 720 describes the results of a technical interview with a removed question feature (element 730) and a set of two schemes for overall grading: a baseline (non-weighted) scheme with an overall score 722 of 8.75 and a weighed scheme with an overall score 724 of 8.64. The removed question 730 option allows a particular question, for whatever reason, to be removed from scoring (either manually or automatically; an automatic removal might be driven by a decision that a particular question is unduly confusing and must be removed from all grading, e.g.). In one embodiment, the lowest scored question is removed, so as, e.g., to avoid disturbing the average value calculation of the baseline scheme or disturb the weightings of the weighted scheme. (Note that in some embodiments of the overall employee certification system, the technical interview scoring is entirely or substantially performed automatically, as described in FIGS. 3A-B and 4).

Area 740 may be used to provide additional measures of hard skills (e.g., programming skills) and/or soft skills (e.g., communications skills) not otherwise captured; the weightings identified (of 60% and 40%) are selectable and may be stored in system database. Area 750 provides a measure of language proficiency, such as proficiency in English. Arca 760 provides a measure of job stability. The final technical candidate ranking value is generated as baseline (non-weighted) value 782 of 8.51 and weighted value 784 of 8.59. In one embodiment, the final technical candidate ranking value is the average of the baseline overall score 712 plus baseline overall score 722, plus any English bonus and plus any resume bonus. In another embodiment, the final technical candidate ranking value is the average of the weighted overall score 714 plus weighted overall score 724, plus any English bonus and plus any resume bonus (these later two values obtained through a look-up table). The English assessment has its own mapping table and schema to convert the candidate's English level into a bonus or discount on the final score. The Resume follows the same logic with its own mapping table. The final technical candidate ranking value is a single number capable of showing how good a candidate is; this formula may be dynamic depending on the number of assessments one obtains from a particular candidate.

A more complex scenario involves a follow-up interview. Sometimes the Interview and the Challenge are not enough to make a decision, requiring a follow up interview. In a follow up interview, one assesses the hard and soft skills, giving each attribute a weight. This enables calculation of the overall score for the follow up meeting which is included in the final score calculation as follows:

FR=AVG (Interview Score+Challenge Score+Follow
Up Interview Score)+English Bonus+Job Stabil-
ity Bonus.

The technical candidate system is flexible enough to include any kind of assessments, so in general the final score calculation is defined as follows:

FR=AVG (Assessment1+Assessment2+Assessment3+
. . . AssesmentN)+English Bonus+Job Stability
Bonus.

Returning to FIG. 2, after completion of step 250, the method proceeds to step 260, where a query is made to determine if language proficiency standards or thresholds have been met. If the response is No, the method proceeds to step 294 and ends (although the candidate and client would be noticed of this result). If the response is Yes, the method 200 proceeds to step 264. This step is a security layer in the hiring process: only experienced interviewers with a broad knowledge of technology and several years of experience work engage in this step. The entire coding challenge and interview is observed to form an independent opinion of the candidate. Feedback from technical vetting engineers who previously graded the candidate will also be considered.

After completing step 264, the method 200 proceeds to step 280 where the candidate is positioned relative to other candidates vying for the same position. The positioning may be by way of a GUI using the user interface 118. After completing step 280, the method 200 proceeds to step 284 in which the candidate, with technical candidate ranking value, is presented to the client. As part of presenting the candidate, a candidate profile may be created based on a candidate application. The profile and/or application may include data such as education level, proficiency in particular software languages or development environments, and the like. These candidate data may be automatically compared against a data of other candidates as stored in the system database. The application and/or profile may be graded.

At the completion of step 284, the method 200 proceeds to step 294 and ends.

The exemplary systems and methods of this disclosure have been described in relation to technical candidate ranking. However, to avoid unnecessarily obscuring the present disclosure, the preceding description omits a number of known structures and devices, and other applications and embodiments. This omission is not to be construed as a limitation of the scope of the claims. Specific details are set forth to provide an understanding of the present disclosure. It should however be appreciated that the present disclosure may be practiced in a variety of ways beyond the specific detail set forth herein.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the methods have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving case and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for certifying a candidate comprising:

a system database configured to: i) store a notional coding file comprising endpoints and software bugs; ii) store a candidate updated coding file and a candidate new coding file; iii) store a set of system scoring parameters comprising a candidate code execution time threshold value; iv) store a set of technical interviews comprising a set of technical interview questions; and v) store a candidate interview audio answer data;

a user interface configured to: i) provide the notional coding file to the candidate; ii) receive from the candidate the candidate new coding file and the candidate updated coding file, the notional coding file changed by the candidate to create the candidate updated coding file; iii) present to the candidate a particular technical interview; and iv) receive the candidate interview audio answer data;

a processor configured to: i) receive a set of candidate requirements; ii) retrieve the candidate new coding file and the candidate updated coding file from the system database; iii) retrieve the set of system scoring parameters from the system database; iv) record the candidate interview audio answer data; and v) record a candidate verbal comment data generated by the candidate while the candidate created the candidate updated coding file;

wherein the processor operates to:

compile and execute the candidate new coding files and the candidate updated coding file;

execute an end to end test on the candidate updated coding file and measure an execution time of the candidate new coding file;

transcribe the candidate verbal comment data into digitally transcribed candidate verbal comment data;

based on the end to end test, determine if the candidate updated coding file does or does not integrate with the endpoints of the notional coding file;

calculate a time difference between the execution time of the candidate new coding file and the candidate code execution time threshold value;

calculate a candidate coding score based on at least the time difference and whether the candidate updated coding file does or does not integrate with the endpoints of the notional coding file;

execute the technical interview to generate the candidate interview audio answer data;

digitally transcribe the candidate interview audio answer data into transcribed candidate interview answer data associated with the set of technical interview questions;

calculate, using at least one of an AI model and an LLM model, a candidate technical interview score based on the transcribed candidate interview answer data; and generate a ranking score and a certification decision for the candidate based at least on the candidate coding score and the candidate technical interview score.

2. The system of claim 1, wherein the candidate technical interview score is established using at least both an AI model and an LLM model.

3. The system of claim 2, wherein the coding score is also at least based on a determination of the candidate updated coding file correcting the software bugs.

4. The system of claim 1, wherein the coding score is also at least based on a code assessment of at least one of code smells, code vulnerabilities, code reliability, and code linting.

5. The system of claim 1, wherein a code assessment is performed using an AI model.

6. The system of claim 1, wherein the transcribed candidate interview answer data is transformed into a set of vector representations.

7. The system of claim 6, wherein the set of vector representations are used as input into an AI model to establish the candidate technical interview score.

8. The system of claim 1, wherein the candidate coding score is also based at least on an evaluation of at least one of test code execution speed, test code security, and test code linting by one or both of an AI model and an LLM model.

9. A method for certifying a candidate comprising:

providing a system database configured to: i) store a notional coding file comprising endpoints and software bugs; ii) store a candidate updated coding file and a candidate new coding file; iii) store a set of system scoring parameters comprising a candidate code execution time threshold value; iv) store a set of technical interviews comprising a set of technical interview questions; and v) store a candidate interview audio answer data;

providing a user interface configured to: i) provide the notional coding file to the candidate; ii) receive from the candidate the candidate new coding file and the candidate updated coding file, the notional coding file changed by the candidate to create the candidate updated coding file; iii) present to the candidate a particular technical interview; and iv) receive the candidate interview audio answer data;

providing a processor configured to: i) receive a set of candidate requirements; ii) retrieve the candidate new coding file and the candidate updated coding file from the system database; iii) retrieve the set of system scoring parameters from the system database; iv) record the candidate interview audio answer data; and v) record a candidate verbal comment data generated by the candidate while the candidate created the candidate updated coding file;

wherein the processor operates to:

compile and execute the candidate new coding files and the candidate updated coding file;

execute an end to end test on the candidate updated coding file and measure an execution time of the candidate new coding file;

transcribe the candidate verbal comment data into digitally transcribed candidate verbal comment data;

based on the end to end test, determine if the candidate updated coding file does or does not integrate with the endpoints of the notional coding file;

calculate a time difference between the execution time of the candidate new coding file and the candidate code execution time threshold value;

calculate a candidate coding score based on at least the time difference and whether the candidate updated coding file does or does not integrate with the endpoints of the notional coding file;

execute the technical interview to generate the candidate interview audio answer data;

digitally transcribe the candidate interview audio answer data into transcribed candidate interview answer data associated with the set of technical interview questions;

calculate, using at least one of an AI model and an LLM model, a candidate technical interview score based on the transcribed candidate interview answer data; and generate a ranking score and a certification decision for the candidate based at least on the candidate coding score and the candidate technical interview score.

10. The method of claim 9, wherein the candidate technical interview score is established using at least both an AI model and an LLM model.

11. The method of claim 10, wherein the coding score is also at least based on a determination of the candidate updated coding file correcting the software bugs.

12. The method of claim 9, the coding score is also at least based on a code assessment of at least one of code smells, code vulnerabilities, code reliability, and code linting.

13. The method of claim 9, wherein a code assessment is performed using an AI model.

14. The method of claim 9, wherein the transcribed candidate interview answer data is transformed into a set of vector representations.

15. The method of claim 14, wherein the set of vector representations are used as input into an AI model to establish the candidate technical interview score.

16. The method of claim 9, wherein the candidate coding score is also based at least on an evaluation of at least one of test code execution speed, test code security, and test code linting by one or both of an AI model and an LLM model.

17. A system for certifying a candidate comprising:

a system database configured to: i) store a notional coding file comprising endpoints; ii) store a candidate updated coding file and a candidate new coding file; iii) store a set of technical interviews comprising a set of technical interview questions; and iv) store a candidate interview audio answer data;

a user interface configured to: i) provide the notional coding file to the candidate; ii) receive from the candidate the candidate new coding file and the candidate updated coding file, the notional coding file changed by the candidate to create the candidate updated coding file; iii) administer to the candidate a particular technical interview; and iv) receive the candidate interview audio answer data;

a processor configured to: i) receive a set of candidate requirements; ii) retrieve the candidate new coding file and the candidate updated coding file from the system database; iii) record the candidate interview audio answer data; and iv) record a candidate verbal comment data generated by the candidate while the candidate created the candidate updated coding file;

wherein the processor operates to:

compile and execute the candidate new coding files and the candidate updated coding file;

execute an end to end test on the candidate updated coding file and measure an execution time of the candidate new coding file;

transcribe the candidate verbal comment data into digitally transcribed candidate verbal comment data;

based on the end to end test, determine if the candidate updated coding file does or does not integrate with the endpoints of the notional coding file;

calculate a candidate coding score based on whether the candidate updated coding file does or does not integrate with the endpoints of the notional coding file;

execute the technical interview to generate the candidate interview audio answer data;

digitally transcribe the candidate interview audio answer data into transcribed candidate interview answer data associated with the set of technical interview questions;

calculate, using at least one of an AI model and an LLM model, a candidate technical interview score based on the transcribed candidate interview answer data; and generate a ranking score and a certification decision for the candidate based at least on the candidate coding score and the candidate technical interview score.

18. The system of claim 17, wherein the candidate technical interview score is established using at least both an AI model and an LLM model.

19. The system of claim 17, wherein the coding score is also at least based on a code assessment of at least one of code smells, code vulnerabilities, code reliability, and code linting performed by an AI engine.

20. The system of claim 17, wherein the candidate coding score is also based at least on an evaluation of at least one of test code execution speed, test code security, and test code linting by one or both of an AI model and an LLM model.

* * * * *